United States Patent
Takeda et al.

(10) Patent No.: US 10,554,883 B2
(45) Date of Patent: Feb. 4, 2020

(54) VR SYSTEM, COMMUNICATION METHOD, AND NON-TRANSITORY COMPUTER-READABLE MEDIUM

(71) Applicant: Ricoh Company, Ltd., Tokyo (JP)

(72) Inventors: Takafumi Takeda, Tokyo (JP); Takuya Soneda, Kanagawa (JP); Hidekuni Annaka, Saitama (JP); Kenichiro Morita, Tokyo (JP); Takeshi Homma, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/367,496

(22) Filed: Mar. 28, 2019

(65) Prior Publication Data
US 2019/0306421 A1 Oct. 3, 2019

(30) Foreign Application Priority Data

Mar. 30, 2018 (JP) .................................. 2018-070370
Mar. 30, 2018 (JP) .................................. 2018-070374
(Continued)

(51) Int. Cl.
*H04N 7/14* (2006.01)
*H04N 5/232* (2006.01)
(Continued)

(52) U.S. Cl.
CPC ......... *H04N 5/23238* (2013.01); *H04N 7/147* (2013.01); *H04N 7/15* (2013.01);
(Continued)

(58) Field of Classification Search
CPC ...................................................... H04N 7/14
See application file for complete search history.

(56) References Cited

U.S. PATENT DOCUMENTS

2015/0363979 A1* 12/2015 Takano .................. A61B 6/461
    345/633
2016/0357261 A1* 12/2016 Bristol .................... A63F 13/24
(Continued)

FOREIGN PATENT DOCUMENTS

| JP | 2017-022587 | 1/2017 |
|----|-------------|--------|
| JP | 2017-028510 | 2/2017 |

OTHER PUBLICATIONS

U.S. Appl. No. 16/131,373, filed Sep. 14, 2018, Takuya Soneda, et al.
(Continued)

*Primary Examiner* — Olisa Anwah
(74) *Attorney, Agent, or Firm* — Xsensus LLP

(57) ABSTRACT

A VR system includes an image capturing device, a communication terminal, a communication management system, and a VR terminal. The communication terminal is configured to input position information of the image capturing device, and transmit, to the communication management system, the position information of the image capturing device and image identification. The communication management system is configured to receive the position information of the image capturing device and the image identification information, and transmit, to the VR terminal, the position information and the image identification information. The VR terminal is configured to store, for each of a plurality of communication terminals, the position information of the image capturing device and the image identification information, select the position information of the image capturing device according to a position of the VR terminal, and display an image of image data indicated by particular image identification information associated with the selected position information.

11 Claims, 34 Drawing Sheets

(30) Foreign Application Priority Data

Mar. 25, 2019 (JP) ................................. 2019-056195
Mar. 25, 2019 (JP) ................................. 2019-056357

(51) Int. Cl.
*H04W 4/029* (2018.01)
*H04N 7/15* (2006.01)
*H04N 7/18* (2006.01)
*H04N 13/282* (2018.01)

(52) U.S. Cl.
CPC ............ *H04N 7/185* (2013.01); *H04W 4/029* (2018.02); *H04N 13/282* (2018.05)

(56) References Cited

U.S. PATENT DOCUMENTS

| | | | |
|---|---|---|---|
| 2017/0339392 A1* | 11/2017 | Forutanpour | H04N 13/161 |
| 2018/0039050 A1* | 2/2018 | Rose | G03B 17/17 |
| 2018/0097682 A1 | 4/2018 | Yoshida et al. | |
| 2018/0098105 A1 | 4/2018 | Morita et al. | |
| 2018/0101989 A1* | 4/2018 | Frueh | G06F 16/5838 |
| 2018/0191787 A1 | 7/2018 | Morita et al. | |
| 2018/0227457 A1 | 8/2018 | Morita et al. | |
| 2019/0082144 A1 | 3/2019 | Hakata et al. | |
| 2019/0089898 A1* | 3/2019 | Kim | H04N 21/85406 |
| 2019/0116350 A1* | 4/2019 | Goto | H04N 13/189 |
| 2019/0197994 A1* | 6/2019 | Kunitomo | G09G 5/37 |
| 2019/0213793 A1* | 7/2019 | Balan | G02B 27/017 |
| 2019/0215505 A1* | 7/2019 | Ishii | H04N 13/344 |
| 2019/0217210 A1* | 7/2019 | Kang | G02B 27/01 |
| 2019/0220090 A1* | 7/2019 | Hudman | G06F 3/012 |
| 2019/0227642 A1* | 7/2019 | Nishizawa | G06F 3/0346 |

OTHER PUBLICATIONS

U.S. Appl. No. 16/140,945, filed Sep. 25, 2018, Yohhei Ohmura, et al.

* cited by examiner

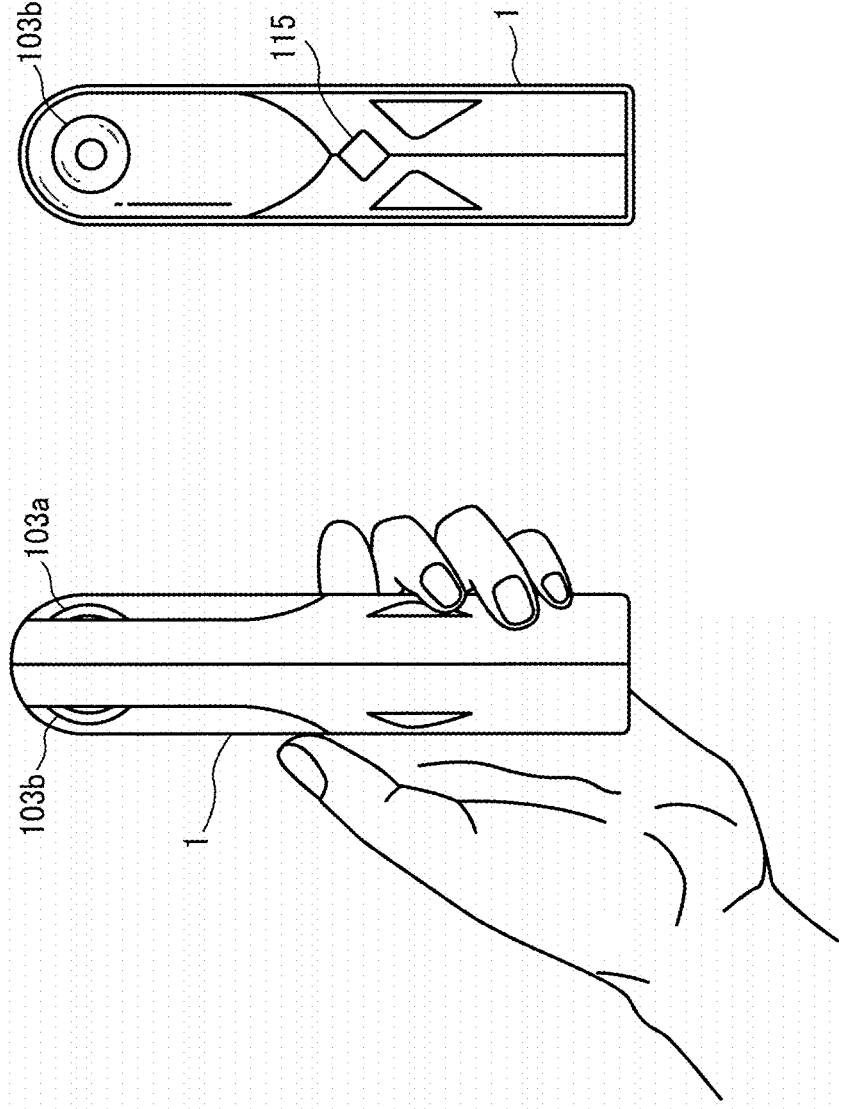
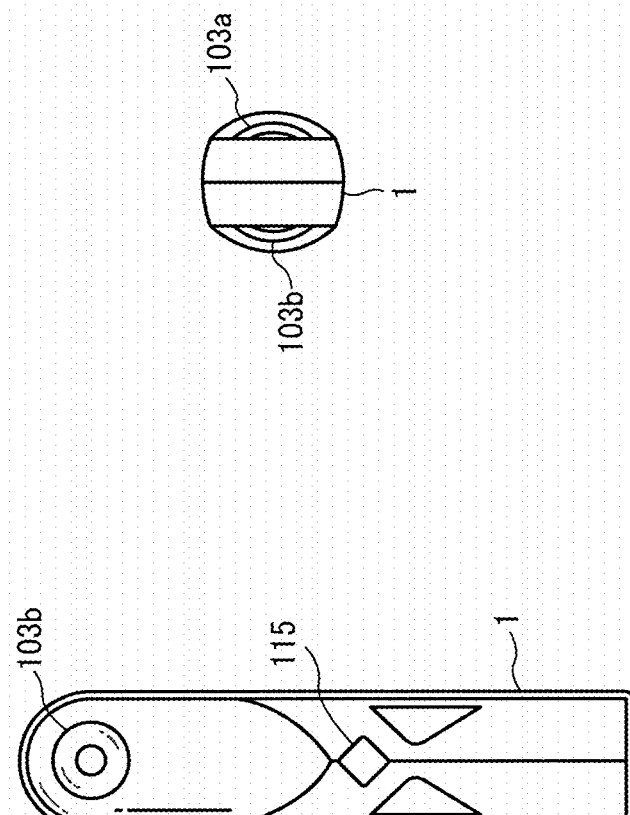
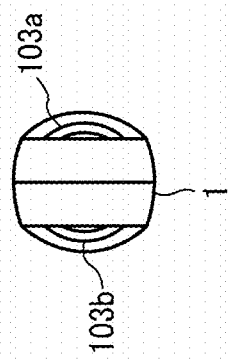

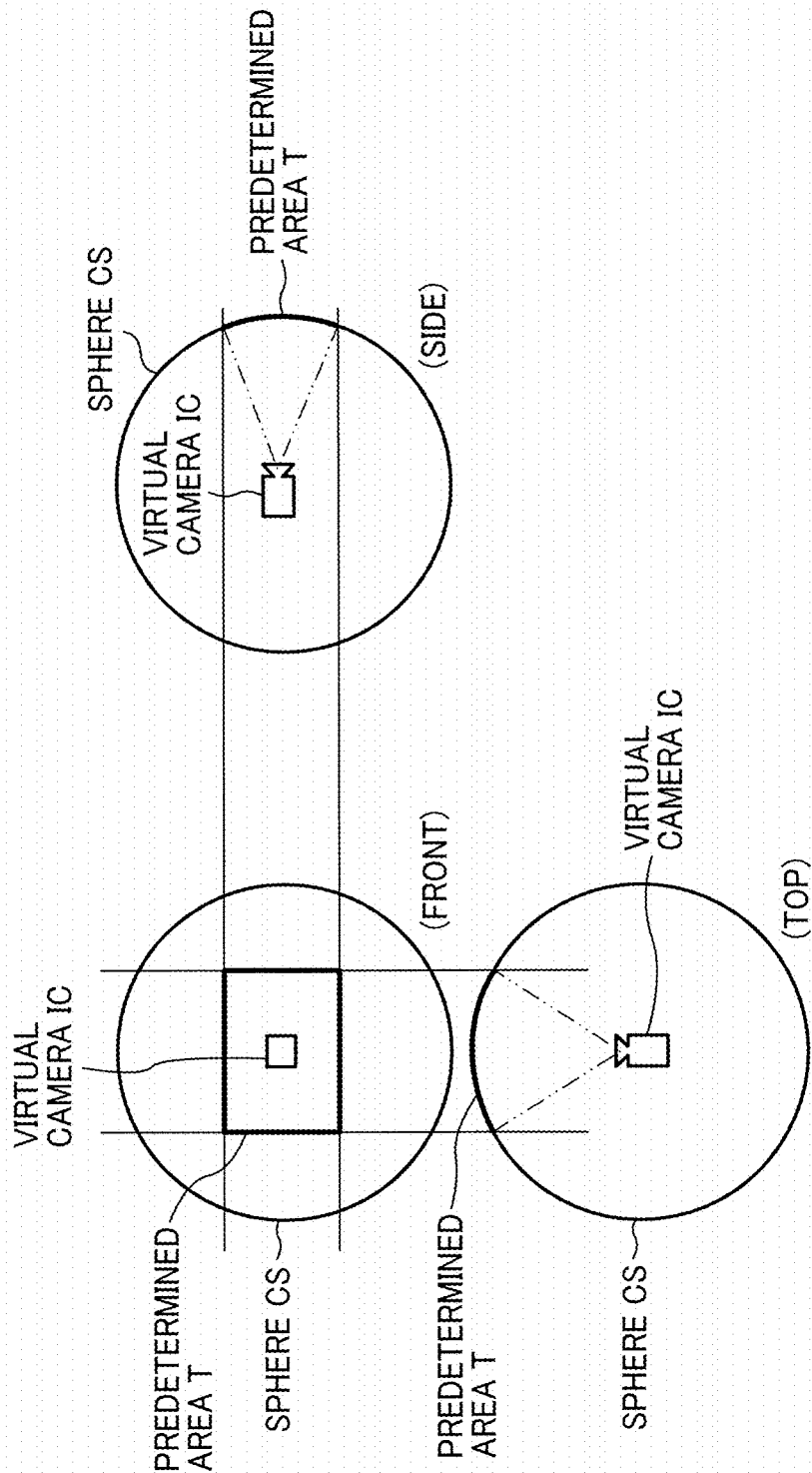

| FIG. 14 |
|---|
| FIG. 14A |
| FIG. 14B |
| FIG. 14C |

FIG. 15

IMAGE TYPE MANAGEMENT TABLE

| IMAGE DATA ID | IP ADDRESS OF SENDER TERMINAL | SOURCE NAME (IMAGE TYPE INFORMATION) |
|---|---|---|
| RS001 | 1.2.1.3 | Video_Theta |
| RS002 | 1.2.2.3 | Video_Theta |
| RS003 | 1.3.1.3 | Video |
| RS004 | 1.2.1.4 | Video |
| RS005 | 1.3.1.4 | Video_Theta |
| ... | ... | ... |

FIG. 16

IMAGE CAPTURING DEVICE MANAGEMENT TABLE

| VENDER ID AND PRODUCT ID OF GUID OF IMAGE CAPTURING DEVICE |
|---|
| vid_05ca&pid_2711 |
| vid_05ca&pid_3822 |
| ... |

FIG. 17

IMAGE CAPTURING DEVICE DIRECTION/POSITION MANAGEMENT TABLE (VIDEOCONFERENCE TERMINAL 3)

| IMAGE DATA ID | VIRTUAL SPACE TOP | VIRTUAL SPACE LEFT | VIRTUAL SPACE BOTTOM | VIRTUAL SPACE RIGHT | DIRECTION $\theta$ (POLAR ANGLE) | DIRECTION $\phi$ (AZIMUTH ANGLE) | MAPPING POSITION X | MAPPING POSITION Y | (MAPPING POSITION Z) |
|---|---|---|---|---|---|---|---|---|---|
| RS001 | -100 | -100 | 100 | 100 | 0 | 0 | -90 | -90 | (0.00) |

FIG. 18

SESSION MANAGEMENT TABLE

| SESSION ID | IP ADDRESS OF PARTICIPATING TERMINAL |
|---|---|
| se101 | 1.2.1.3, 1.2.2.3, 1.3.1.3, 1.2.1.4, 1.3.1.4, 1.7.1.4 |
| se102 | 1.4.1.1, 1.4.1.2 |
| ... | ... |

FIG. 19

IMAGE TYPE MANAGEMENT TABLE

| SESSION ID | IMAGE DATA ID | IP ADDRESS OF SENDER TERMINAL | SOURCE NAME (IMAGE TYPE INFORMATION) |
|---|---|---|---|
| se101 | RS001 | 1.2.1.3 | Video_Theta |
| se101 | RS002 | 1.2.2.3 | Video_Theta |
| se101 | RS003 | 1.3.1.3 | Video |
| se101 | RS004 | 1.2.1.4 | Video |
| se101 | RS005 | 1.3.1.4 | Video_Theta |
| se102 | RS006 | 1.4.1.1 | Video_Theta |
| se101 | RS010 | 1.7.1.4 | Video |
| se102 | RS011 | 1.4.1.2 | Video |
| ... | ... | ... | ... |

FIG. 20

IMAGE CAPTURING DEVICE DIRECTION/POSITION LIST MANAGEMENT TABLE (COMMUNICATION MANAGEMENT SYSTEM 5, PC7)

| SESSION ID | IMAGE DATA ID | IP ADDRESS OF SENDER TERMINAL | VIRTUAL SPACE TOP | VIRTUAL SPACE LEFT | VIRTUAL SPACE BOTTOM | VIRTUAL SPACE RIGHT | DIRECTION θ (POLAR ANGLE) | DIRECTION φ (AZIMUTH ANGLE) | MAPPING POSITION X | MAPPING POSITION Y | MAPPING POSITION Z |
|---|---|---|---|---|---|---|---|---|---|---|---|
| se101 | RS001 | 1.2.1.3 | −100 | −100 | 10 | 10 | 0 | 0 | −0.90 | −0.90 | (0.00) |
| se101 | RS002 | 1.2.2.3 | 0 | 0 | 0 | 0 | 0 | 0 | 0.90 | 0.90 | (0.00) |
| se101 | RS003 | 1.7.1.4 | Null | Null | Null | Null | Null | Null | Null | Null | Null |
| ... | ... | ... | ... | ... | ... | ... | ... | ... | ... | ... | ... |

FIG. 21

| VIRTUAL MAXIMUM SPACE TOP | VIRTUAL MAXIMUM SPACE LEFT | VIRTUAL MAXIMUM SPACE BOTTOM | VIRTUAL MAXIMUM SPACE RIGHT | SCALE X | SCALE Y | (SCALE Z) |
|---|---|---|---|---|---|---|
| −100 | −100 | 100 | 100 | 100 | 100 | (0) |

FIG. 22

| DIRECTION $\theta$ (POLAR ANGLE) | DIRECTION $\phi$ (AZIMUTH ANGLE) | POSITION X | POSITION Y | (POSITION Z) |
|---|---|---|---|---|
| 0 | 0 | 0.90 | 0.10 | (0.00) |

FIG. 28

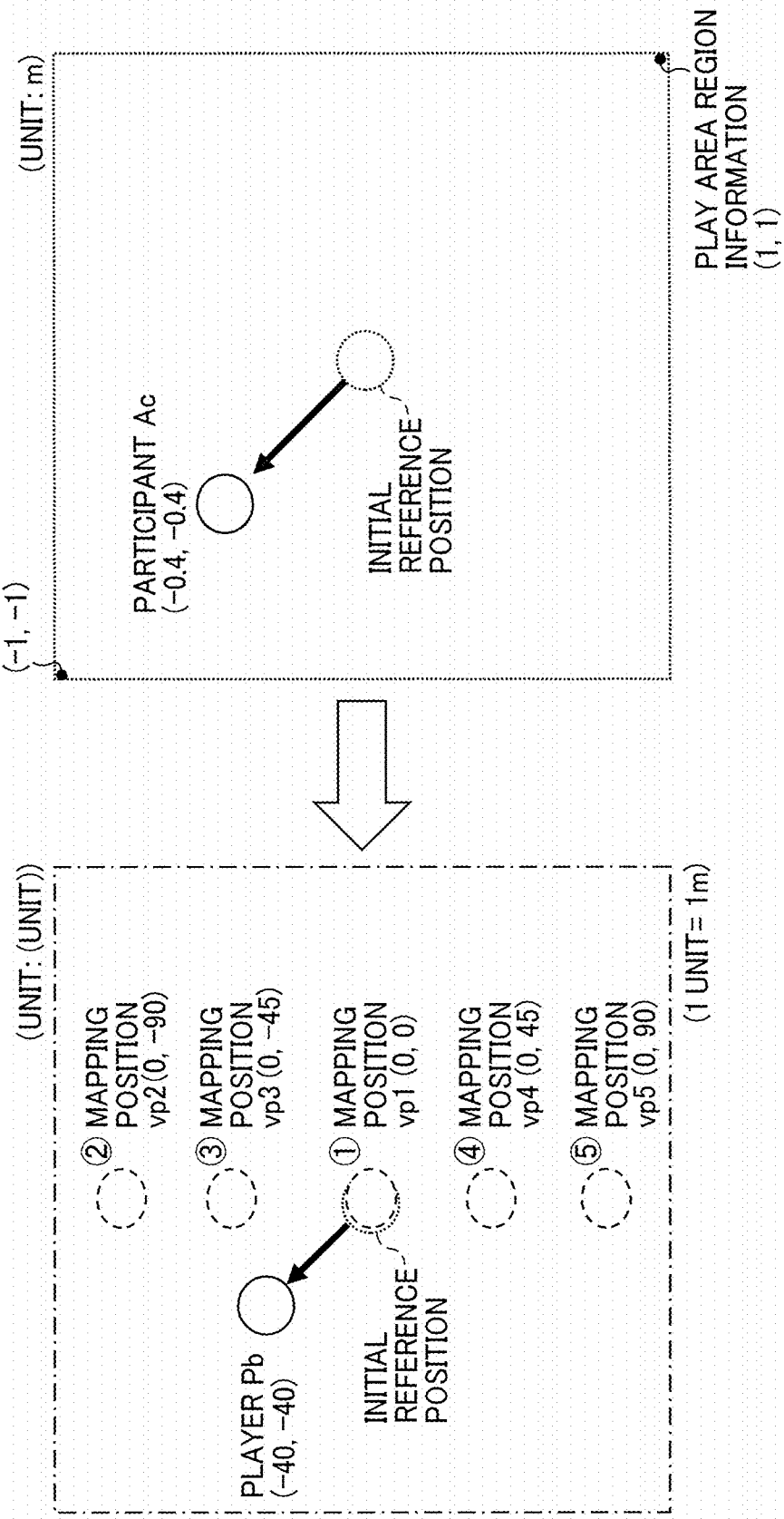

VR SYSTEM, COMMUNICATION METHOD, AND NON-TRANSITORY COMPUTER-READABLE MEDIUM

CROSS-REFERENCE TO RELATED APPLICATIONS

This patent application is based on and claims priority under 35 U.S.C. § 119(a) to Japanese Patent Application No. 2018-070370, filed on Mar. 30, 2018, No. 2018-070374, filed on Mar. 30, 2018, No. 2019-056195, filed on Mar. 25, 2019, and No. 2019-056357, filed on Mar. 25, 2019, the entire disclosures of which are incorporated herein by reference.

BACKGROUND

Technical Field

The present disclosure relates to a virtual reality (VR) system, a communication method, and a non-transitory computer-readable medium.

Description of the Related Art

A method is known for generating images to which time stamps and numbers are assigned based on position information of a plurality of celestial-sphere cameras in order to generate a moving image viewed from multiple viewpoints as if moving around with respect to a point of gaze that moves with the time being stopped. This method is implemented by a multi-viewpoint image generating apparatus that generates a multi-viewpoint image in which a subject is displayed with different viewpoints based on images captured by celestial-sphere cameras each including a fisheye lens or a super wide-angle lens.

SUMMARY

According to an embodiment of the present disclosure, a virtual reality (VR) system includes an image capturing device; a communication terminal including first circuitry; a communication management system including second circuitry; and a VR terminal including third circuitry. The first circuitry of the communication terminal is configured to: input position information of the image capturing device; and transmit, to the communication management system, the position information of the image capturing device and image identification information for identifying image data to be transmitted by the communication terminal. The second circuitry of the communication management system is configured to: receive the position information of the image capturing device and the image identification information; and transmit, to the VR terminal, the position information of the image capturing device and the image identification information that are associated with each other. The third circuitry of the VR terminal is configured to store in a memory, for each of a plurality of communication terminals including the communication terminal, the position information of the image capturing device and the image identification information associated with the position information of the image capturing device, transmitted from the communication management system; select, from among the position information stored in the memory, the position information of the image capturing device according to a position of the VR terminal; and display an image of image data indicated by particular image identification information associated with the selected position information on a display.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIG. 1A is a left side view of an image capturing device, according to an embodiment of the present disclosure;

FIG. 1B is a front view of the image capturing device of FIG. 1A;

FIG. 1C is a plan view of the image capturing device of FIG. 1A;

FIG. 5 is an illustration of relative positions of a virtual camera and a predetermined area in a case where the spherical panoramic image is represented as a three-dimensional sphere, according to an embodiment of the present disclosure;

FIG. 15 is a conceptual diagram illustrating an image type management table, according to an embodiment of the present disclosure;

FIG. 16 is a conceptual diagram illustrating an image capturing device management table, according to an embodiment of the present disclosure;

FIG. 17 is a conceptual diagram illustrating a direction/position management table stored in the videoconference terminal, according to an embodiment of the present disclosure;

FIG. 18 is a conceptual diagram illustrating a session management table, according to an embodiment of the present disclosure;

FIG. 19 is a conceptual diagram illustrating an image type management table, according to an embodiment of the present disclosure;

FIG. 20 is a conceptual diagram illustrating an image capturing device direction/position list management table stored in the communication management system and the PC, according to an embodiment of the present disclosure;

FIG. 21 is a conceptual diagram illustrating virtual maximum space information stored in virtual maximum space storage unit, according to an embodiment of the present disclosure;

FIG. 22 is a conceptual diagram illustrating head-mounted display information stored in a head-mounted display direction/position storage unit, according to an embodiment of the present disclosure;

FIG. 28 is a diagram illustrating a position of the videoconference terminal (image capturing device in the exhibition venue in the virtual space, according to an embodiment of the present disclosure;

FIG. 36 is an illustration for describing another example of the movement in the virtual space and how an image to be displayed is automatically selected from images generated by the videoconference terminal and the image capturing device, according to an embodiment of the present disclosure.

Figure 2:
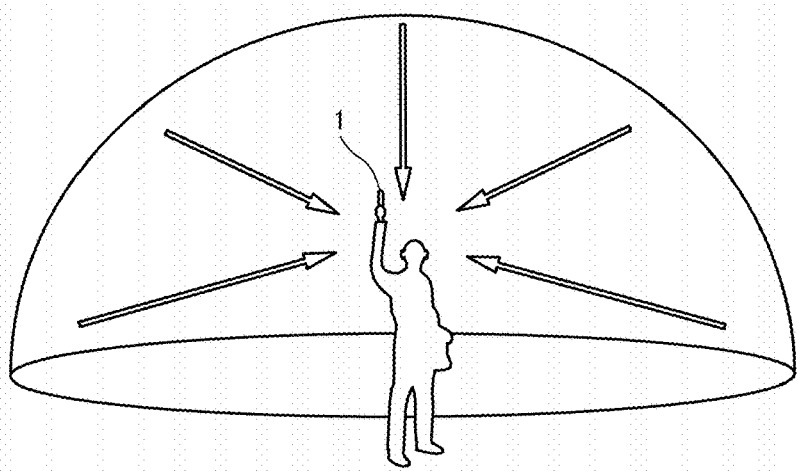
FIG. 2 is an illustration of how a user uses the image capturing device, according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring to the drawings, embodiments of the present disclosure are described.

Overview of Embodiment

<Generation of Spherical Panoramic Image>

Referring to FIG. 1 (FIGS. 1A to 1C) to FIG. 7, a description is given of generating a spherical panoramic image.

First, a description is given of an external view of an image capturing device 1, with reference to FIG. 1A to FIG. 1C. The image capturing device 1 is a celestial-sphere (digital) camera for capturing images from which a three-dimensional spherical image is generated. In one example, the spherical image captured by the image capturing device 1 is a 360-degree spherical panoramic image (full-view spherical image). FIGS. 1A, 1B and 1C are respectively a left side view, a front view, and a plan view (top view) of the image capturing device 1.

As illustrated in FIG. 1A, the image capturing device 1 has a shape such that one can hold it with one hand. Further, as illustrated in FIGS. 1A, 1B, and 1C, an imaging element 103a is provided on a front side (anterior side) of an upper section of the image capturing device 1, and an imaging element 103b is provided on a back side (rear side) thereof. These imaging elements (image sensors) 103a and 103b are used in combination with optical members (e.g., fisheye lenses 102a and 102b, described below), each being configured to capture a hemispherical image having an angle of view of 180 degrees or wider. As illustrated in FIG. 1B, the image capturing device 1 further includes an operation unit 115 such as a shutter button on the rear side of the image capturing device 1, which is opposite of the front side of the image capturing device 1.

Next, a description is given of a situation where the image capturing device 1 is used, with reference to FIG. 2. FIG. 2 illustrates an example of how a user uses the image capturing device 1. As illustrated in FIG. 2, for example, the image capturing device 1 is used for capturing objects surrounding a user who is holding the image capturing device 1 in his or her hand. The imaging elements 103a and 103b illustrated in FIGS. 1A to 1C capture the objects surrounding the user to obtain two hemispherical images.

Figure 3A:
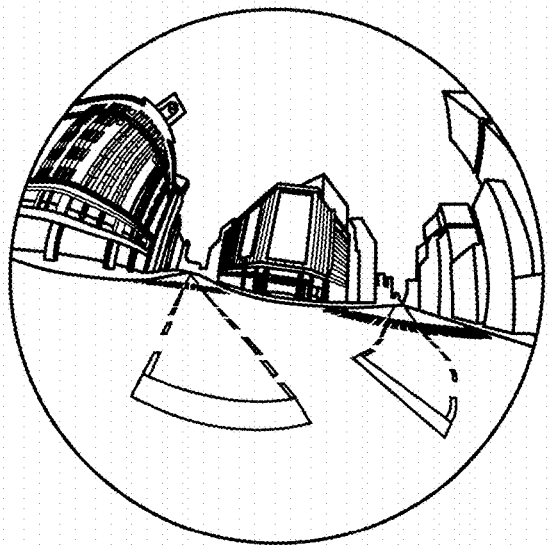
FIG. 3A is an illustration of a front side of a hemispherical image captured by the image capturing device, according to an embodiment of the present disclosure.
Figure 3B:
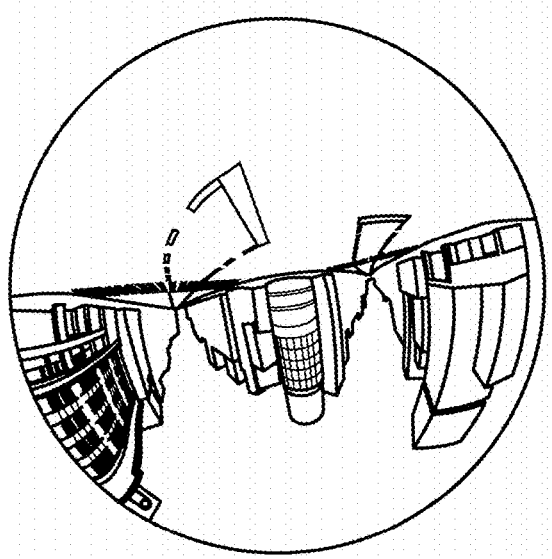
FIG. 3B is an illustration of a back side of a hemispherical image captured by the image capturing device, according to an embodiment of the present disclosure.
Figure 3C:
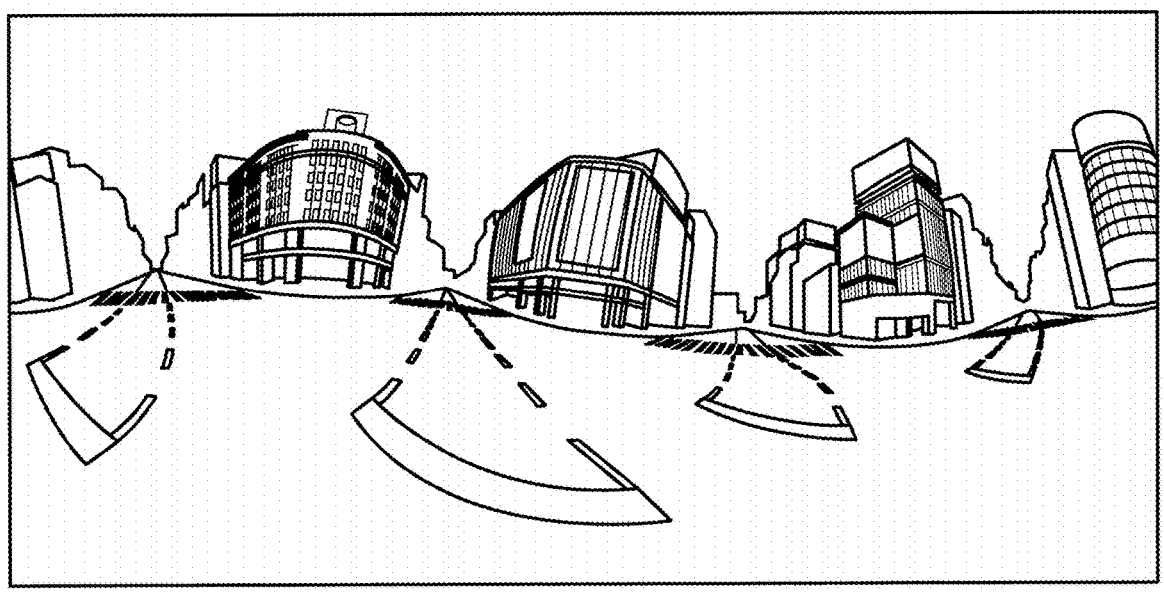
FIG. 3C is an illustration of an image captured by the image capturing device represented by Mercator projection, according to an embodiment of the present disclosure.
Figure 4B:
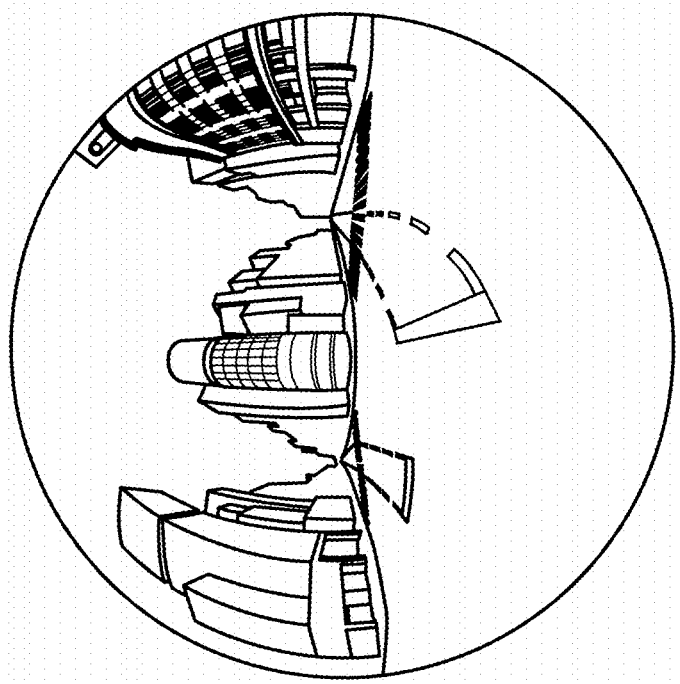
FIG. 4B is an illustration of a spherical panoramic image, according to an embodiment of the present disclosure.
Figure 4A:
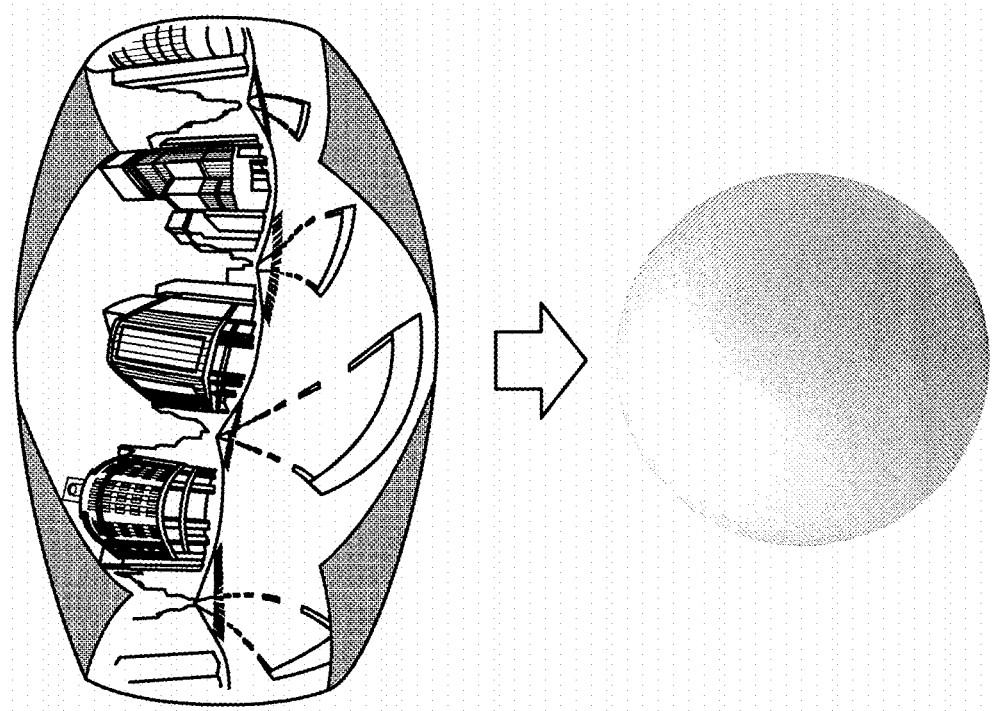
FIG. 4A is an illustration of a Mercator image covering a sphere, according to an embodiment of the present disclosure.

Next, a description is given of an overview of an operation of generating a spherical panoramic image from the images captured by the image capturing device 1, with reference to FIGS. 3A to 3C and FIGS. 4A and 4B. FIG. 3A is a view illustrating a hemispherical image (front side) captured by the image capturing device 1. FIG. 3B is a view illustrating a hemispherical image (back side) captured by the image capturing device 1. FIG. 3C is a view illustrating an image in Mercator projection. The image in Mercator projection as illustrated in FIG. 3C is referred to as a "Mercator image" hereinafter. FIG. 4A is a conceptual diagram illustrating an example of how the Mercator image maps to a surface of a sphere. FIG. 4B is a view illustrating a spherical panoramic image.

As illustrated in FIG. 3A, an image captured by the imaging element 103a is a curved hemispherical image (front side) taken through the fisheye lens 102a described below. In addition, as illustrated in FIG. 3B, an image captured by the imaging element 103b is a curved hemispherical image (back side) taken through the fisheye lens 102b described below. The image capturing device 1 combines one hemispherical image (front side) and the other hemispherical image (back side), which is reversed by 180-degree, to generate the Mercator image as illustrated in FIG. 3C.

The Mercator image is mapped on the sphere surface using Open Graphics Library for Embedded Systems (OpenGL ES) as illustrated in FIG. 4A. This results in generation of the spherical panoramic image as illustrated in FIG. 4B. In other words, the spherical panoramic image is represented as the Mercator image, which corresponds to a surface facing a center of the sphere. OpenGL ES is a graphic library used for visualizing two-dimensional (2D) and three-dimensional (3D) data. The spherical panoramic image is either a still image or a moving image.

One may feel strange viewing the spherical panoramic image, because the spherical panoramic image is an image mapped to the sphere surface. To resolve this strange feeling, an image of a predetermined area, which is a part of the spherical panoramic image, is displayed as a planar (flat) image having fewer curves. In this disclosure, the image of the predetermined area is referred to as a "predetermined-area image". Hereinafter, a description is given of displaying the predetermined-area image, with reference to FIG. 5 and FIG. 6.

FIG. 5 is an illustration of a positional relation between a virtual camera IC and the predetermined area, when the spherical panoramic image is represented as a surface area of three-dimensional solid sphere. The virtual camera IC corresponds to a position of a point of view (viewpoint) of a user who is viewing the spherical panoramic image represented as a surface area of the three-dimensional solid sphere CS.

Figure 6:
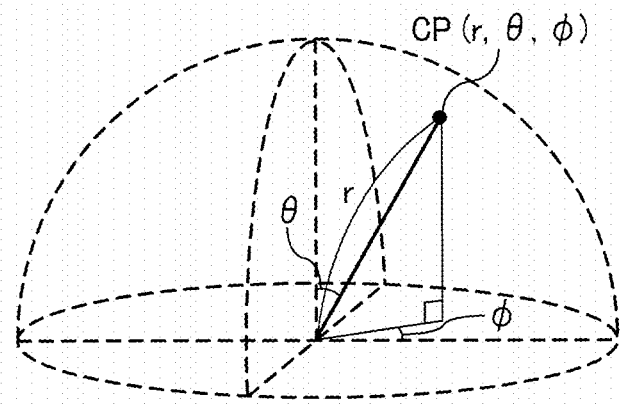
FIG. 6 is a diagram illustrating points in a three-dimensional Euclidean space according to spherical coordinates, according to an embodiment of the present disclosure.

FIG. 5 is an illustration of a positional relation between a virtual camera IC and the predetermined area, when the spherical panoramic image is represented as a surface area of three-dimensional solid sphere. FIG. 6 is a diagram illustrating a point in a three-dimensional Euclidean space according to spherical coordinates, according to the present embodiment. A positional coordinate (r, θ, φ) is given when the center point CP is represented by a spherical polar coordinate system. The positional coordinate (r, θ, φ) represents a moving radius, a polar angle, and an azimuth angle. The moving radius r is a distance from the origin of the three-dimensional virtual space including the spherical panoramic image to the center point CP. Accordingly, the moving radius r is equal to Distance "f", which is a distance from the virtual camera IC to the center point CP of the predetermined area T. A description is given below of an image capturing device direction/position management table stored in a videoconference terminal 3 with reference to FIG. 17 using the polar angle and the azimuth angle (θ, φ) of the virtual camera IC. The "videoconference terminal 3" is a generic term for a videoconference terminal 3a to a videoconference terminal 3f described below.

Figure 7:
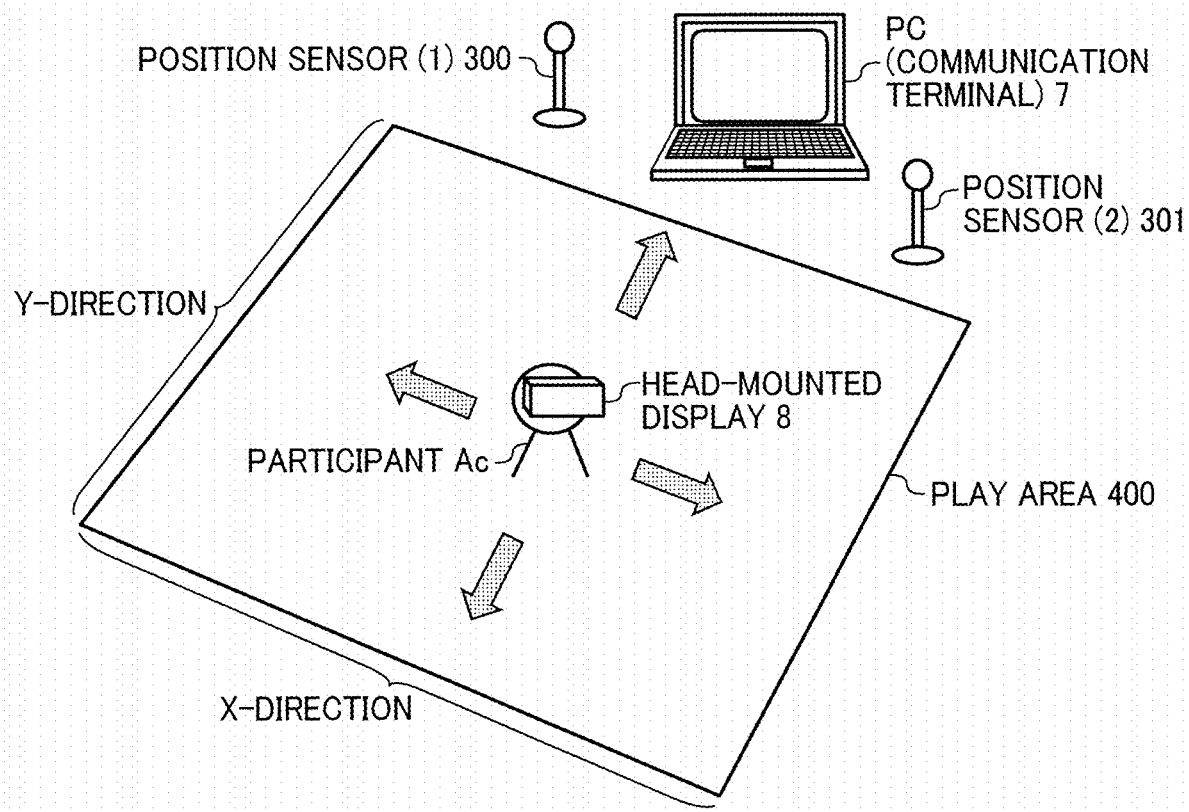
FIG. 7 is a diagram illustrating an example of a configuration of a room scale, according to an embodiment of the present disclosure.

FIG. 7 is a diagram illustrating an example of a configuration of "room scale", which is one of means for moving in a virtual space. In room scale, two or more position sensors are usually used. In the present embodiment, a position sensor (1) 300 and a position sensor (2) 301 located in a play area 400 are used to identify a position of a participant Ac in the play area 400.

The participant Ac can move in a virtual space using any suitable system other than room scale, such as using a "warp" key or a "cross key".

The PC 7 performs processing for display to the head-mounted display terminal 8 and processing for connecting to the videoconference terminal 3. The PC 7 is one example of a communication terminal. The PC 7 is communicable with the head-mounted display terminal 8, the position sensor (1) 300, and the position sensor (2) 301. The participant Ac wears the head-mounted display terminal 8. The room scale detects the position of the head-mounted display terminal 8 that the participant Ac is wearing. A range in which the participant Ac can walk around is defied by the play area 400. In the embodiment, a horizontal axis of the play area 400 is defined as an X-direction, and a vertical axis of the play area 400 is defined as a Y-direction.

The head-mounted display terminal 8 can perform wired and wireless communication with the PC 7. The combination of the head-mounted display terminal 8 and the PC 7 constitute a virtual reality (VR) terminal. However, one smartphone can be used as an alternative of the combination of the head-mounted display terminal 8 and the PC 7. The head-mounted display terminal 8 performs infrared communication with the position sensor (1) 300 and the position sensor (2) 301.

The communication management system 5 relays communication between the VR terminal and any one of the videoconference terminals 3a to 3f In a case where Peer to Peer (P2P) communication is adopted, the videoconference terminals 3a to 3f exchanges direction and position information of the VR terminal without being relayed by the communication management system 5.

Figure 8:
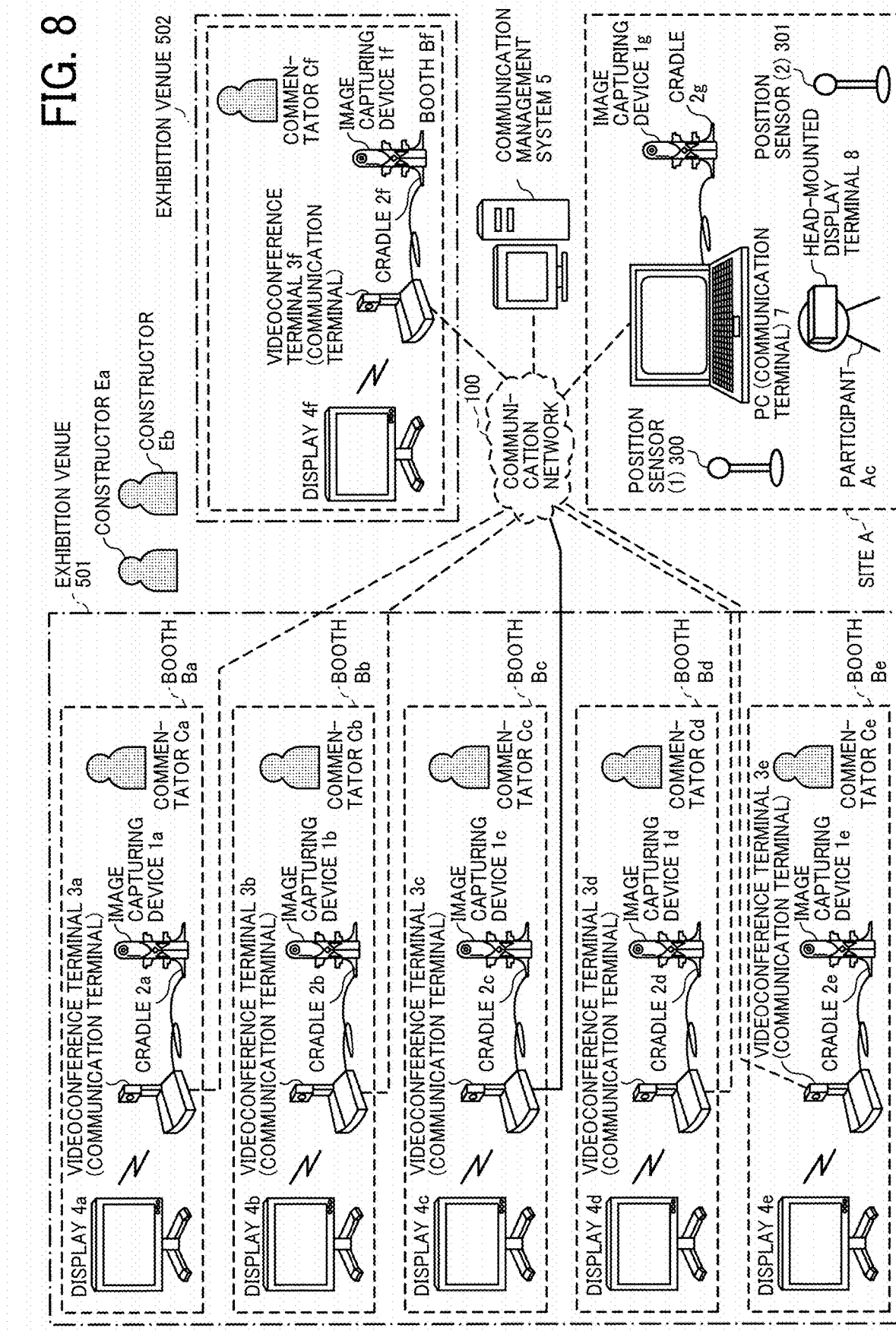
FIG. 8 is a schematic diagram illustrating a configuration of an image communication system (exhibition), according to an embodiment of the present disclosure.

FIG. 8 is a diagram illustrating an example in which five videoconference systems and five celestial-sphere cameras are used at one exhibition venue, and one videoconference system and one celestial-sphere camera are used at the other exhibition venue. The one exhibition venue is an exhibition venue 501 and the other exhibition venue is an exhibition venue 502. Different session IDs (identifiers) are assigned to the exhibition venue 501 and the exhibition venue 502, respectively. The description of the session ID is provided below with reference to FIG. 18.

An imaging capturing device 1a to an image capturing device 1f described below are an example of the imaging capturing device 1. A cradle 2a to a cradle 2f are an example of a cradle 2. The videoconference terminal 3a to the videoconference terminal 3f are an example of the videoconference terminal 3. A display 4a to a display 4f are an example of a display 4. A booth Ba to a booth Bf are an example of a booth B. A commentator Ca to a commentator Cf are an example of a commentator C.

A description of given hereinafter of the exhibition venue 501. In the booth Ba, the commentator Ca is present. Further, in the booth Ba, the display 4a and the videoconference terminal 3a are located. To the videoconference terminal 3a, an image capturing device 1a is connected. The image capturing device 1a can be any one of a celestial-sphere camera, a general-purpose camera, and a hemispherical panoramic camera. A constructor (a person who sets up the booths) Ea installs the videoconference terminals 3a to 3e in the booths Ba to Be, respectively. In another example, the commentators Ca to Ce can install the videoconference terminals 3a to 3e. The constructor Ea and a constructor Eb enter information of a mapping position from each of the videoconference terminals 3a to 3e. In another example, the commentators Ca to Cf enter information of the mapping position from each of the videoconference terminals 3a to 3f, in place of the constructor Ea and the constructor Eb. The videoconference terminals 3a to 3f are connected to a communication management system 5 through a communication network 100 such as the Internet.

A description of given hereinafter of the exhibition venue 502. In a booth Bf, a commentator Cf is present. Further, in the booth Bf, the display 4f and the videoconference terminal 3f are located. To the videoconference terminal 3f, an image capturing device 1f is connected. The image capturing device 1f can be any one of a celestial-sphere camera, a general-purpose camera, and a hemispherical panoramic camera. The commentator Cf installs the videoconference terminal 3f in the booth Bf. The commentator Cf also enters information of a mapping position from the videoconference terminal 3f. The videoconference terminal 3f is connected to the videoconference terminals 3a to 3e via the communication network 100 such as the Internet.

A description is given hereinafter of a site A. A participant Ac participating in an exhibition in the site A, which is a remote place, wears the head-mounted display terminal 8 and connects to the communication management system 5 using the PC 7. To the PC 7, the image capturing device 1g and the cradle 2g are connected.

Figure 24:
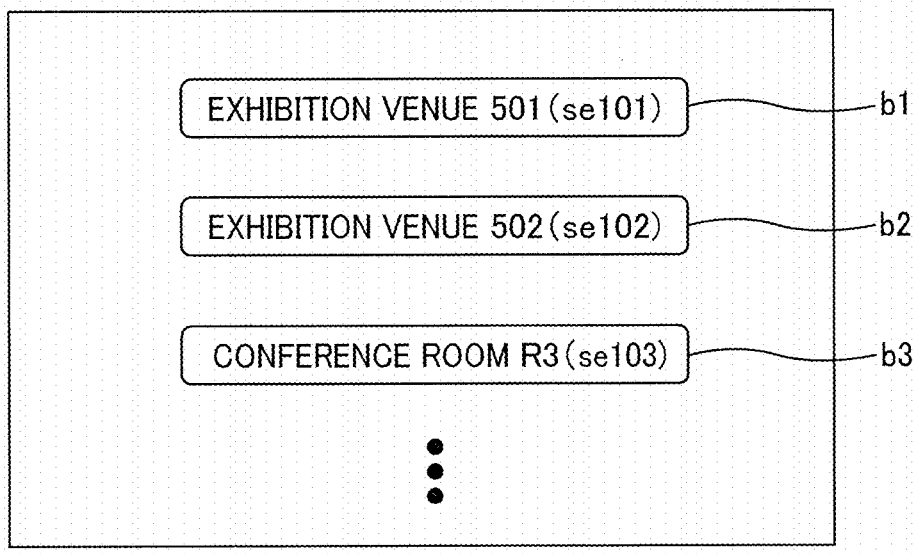
FIG. 24 is an illustration of a session selection screen for selecting a communication session (virtual conference room), according to an embodiment of the present disclosure.

The participant Ac selects a connection destination from among at least the exhibition venue 501 and the exhibition venue 502 via a session selection screen for selecting a communication session (virtual conference room) as illustrated in FIG. 24. Based on the selected exhibition venue, a virtual space is automatically generated, and position information of the image capturing device located in the selected exhibition venue is mapped, according to an operation illustrated in a flowchart of FIG. 30.

<<Hardware Configuration of Embodiment>>

Hereinafter, a description is given of hardware configurations of the image capturing device 1, the videoconference terminal 3a to 3f (collectively referred to as the "videoconference terminal 3"), the communication management system 5, the PC 7 or a smartphone, and the head-mounted display terminal 8 according to the present embodiment, with reference to FIG. 9 to FIG. 13.

<Hardware Configuration of Image Capturing Device 1>

Figure 9:
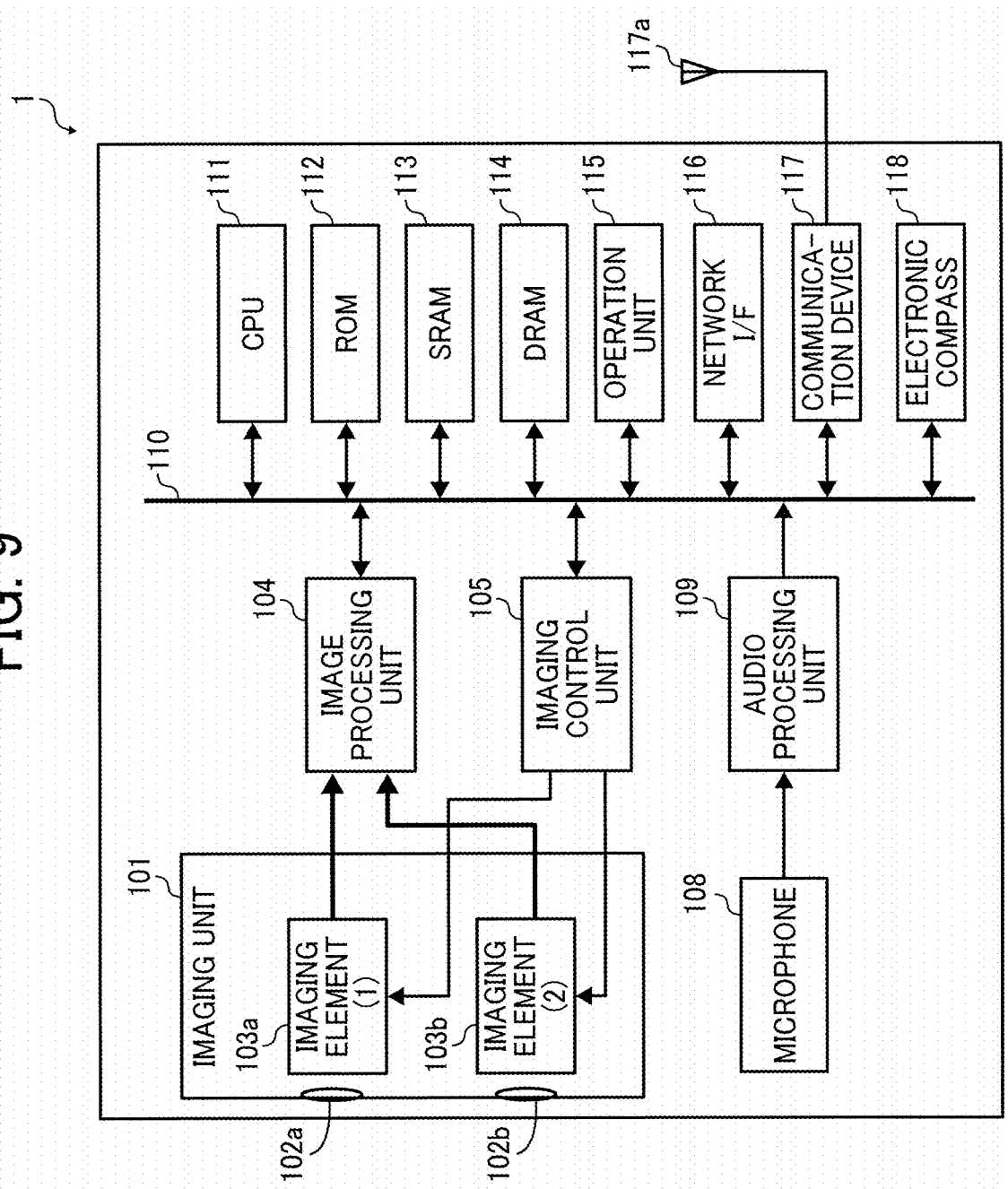
FIG. 9 is a block diagram illustrating a hardware configuration of the image capturing device, according to an embodiment of the present disclosure.

First, a description is given of a hardware configuration of the image capturing device 1, with reference to FIG. 9. FIG. 9 is a block diagram illustrating a hardware configuration of the image capturing device 1 according to the embodiment. The following describes an example case in which the image capturing device 1 is a celestial-sphere (omnidirectional) image capturing device having two imaging elements. However, the image capturing device 1 can include any suitable number of imaging elements, providing that it includes at least two imaging elements. In addition, the image capturing device 1 is not necessarily an image capturing device dedicated to omnidirectional image capturing. In another example, an external omnidirectional image capturing unit can be attached to a general-purpose digital camera or a smartphone to implement an image capturing device having substantially the same function as that of the image capturing device 1.

As illustrated in FIG. 9, the image capturing device 1 includes an imaging unit 101, an image processing unit 104, an imaging control unit 105, a microphone 108, an audio processing unit 109, a central processing unit (CPU) 111, a read only memory (ROM) 112, a static random access memory (SRAM) 113, a dynamic random access memory (DRAM) 114, the operation unit 115, a network interface (I/F) 116, a communication device 117, and an antenna 117a.

The imaging unit 101 includes two wide-angle lenses (so-called fisheye lenses) 102a and 102b, each having an angle of view of equal to or greater than 180 degrees so as to form a hemispherical image. The imaging unit 101 further includes the two imaging elements 103a and 103b corresponding to the wide-angle lenses 102a and 102b respectively. Each of the imaging elements 103a and 103b includes an imaging sensor such as a complementary metal oxide semiconductor (CMOS) sensor and a charge-coupled device (CCD) sensor, a timing generation circuit, and a group of registers. The imaging sensor converts an optical image formed by the fisheye lenses 102a and 102b into electric signals to output image data. The timing generation circuit generates horizontal or vertical synchronization signals, pixel clocks and the like for the imaging sensor. Various commands, parameters and the like for operations of the imaging elements 103a and 103b are set in the group of registers.

Each of the imaging elements 103a and 103b of the imaging unit 101 is connected to the image processing unit 104 via a parallel I/F bus. In addition, each of the imaging elements 103a and 103b of the imaging unit 101 is connected to the imaging control unit 105 via a serial I/F bus such as an I2C bus. Each of the image processing unit 104 and the imaging control unit 105 is connected to the CPU 111 via a bus 110. Furthermore, the ROM 112, the SRAM 113, the DRAM 114, the operation unit 115, the network I/F 116, the communication device 117, and the electronic compass 118 are also connected to the bus 110.

The image processing unit 104 obtains image data from each of the imaging elements 103a and 103b via the parallel I/F bus and performs predetermined processing on the image data obtained from each of the imaging elements 103a and 103b separately. Thereafter, the image processing unit 104 combines these image data to generate data of the Mercator image as illustrated in FIG. 3C.

The imaging control unit 105 usually functions as a master device while each of the imaging elements 103a and 103b usually functions as a slave device. The imaging control unit 105 sets commands and the like in the group of registers of each of the imaging elements 103a and 103b via the I2C bus. The imaging control unit 105 receives necessary commands from the CPU 111. Further, the imaging control unit 105 obtains status data of the group of registers of each of the imaging elements 103a and 103b via the I2C bus. The imaging control unit 105 sends the obtained status data to the CPU 111.

The imaging control unit 105 instructs the imaging elements 103a and 103b to output the image data at a time when the shutter button of the operation unit 115 is pressed. The image capturing device 1 can support a preview display function (e.g., displaying a preview on a display such as a display of the videoconference terminal 3a) or a movie display function. In case of displaying movie, image data are continuously output from the imaging elements 103a and 103b at a predetermined frame rate (frames per minute).

Furthermore, the imaging control unit 105 operates in cooperation with the CPU 111, to synchronize the time when the imaging element 103a outputs image data and the time when the imaging element 103b outputs the image data. In the present embodiment, the image capturing device 1 does not include a display unit (display). However, in another example, the image capturing device 1 can include a display.

The microphone 108 converts sound into audio data (signals). The audio processing unit 109 obtains audio data output from the microphone 108 via an I/F bus and performs predetermined processing on the audio data.

The CPU 111 controls entire operation of the image capturing device 1 and performs necessary processing. The ROM 112 stores various programs for execution by the CPU 111. Each of the SRAM 113 and the DRAM 114 operates as a work memory to store programs loaded from the ROM 112 for execution by the CPU 111 or data being currently processed. More specifically, in one example, the DRAM 114 stores image data currently processed by the image processing unit 104 and data of the Mercator image on which processing has been performed.

The operation unit 115 collectively refers to various operation keys, a power switch, the shutter button, and a touch panel having functions of both displaying information and receiving input from a user, which can be used in combination. A user operates the operation keys to input various image capturing (photographing) modes or image capturing (photographing) conditions.

The network I/F 116 collectively refers to an interface circuit such as a USB I/F that enables the image capturing device 1 to communicate data with an external medium such as a secure digital (SD) card or an external personal computer. The network I/F 116 supports at least one of wired and wireless communications. The data of the Mercator image, which is stored in the DRAM 114, can be stored in the external medium via the network I/F 116 or transmitted to extraneous sources such as the videoconference terminal 3a via the network I/F 116, as needed.

The communication device 117 communicates with extraneous sources such as the videoconference terminal 3a via the antenna 117a of the image capturing device 1 using a short-range wireless communication network such as Wi-Fi and Near Field Communication (NFC). The communication device 117 can also transmits the data of Mercator image to the extraneous sources such as the videoconference terminal 3a.

The electronic compass 118 computes an orientation and a tilt (roll angle) of the image capturing device 1 based on the Earth's magnetism to output orientation and tilt information. This orientation and tilt information is an example of related information, which is metadata described in compliance with Exif. This information is used for image processing such as image correction on captured images. The related information also includes data indicating a time (date) when an image is captured by the image capturing device 1, and data indicating a size of image data, for example.

<Hardware Configuration of Videoconference Terminal 3>

Figure 10:
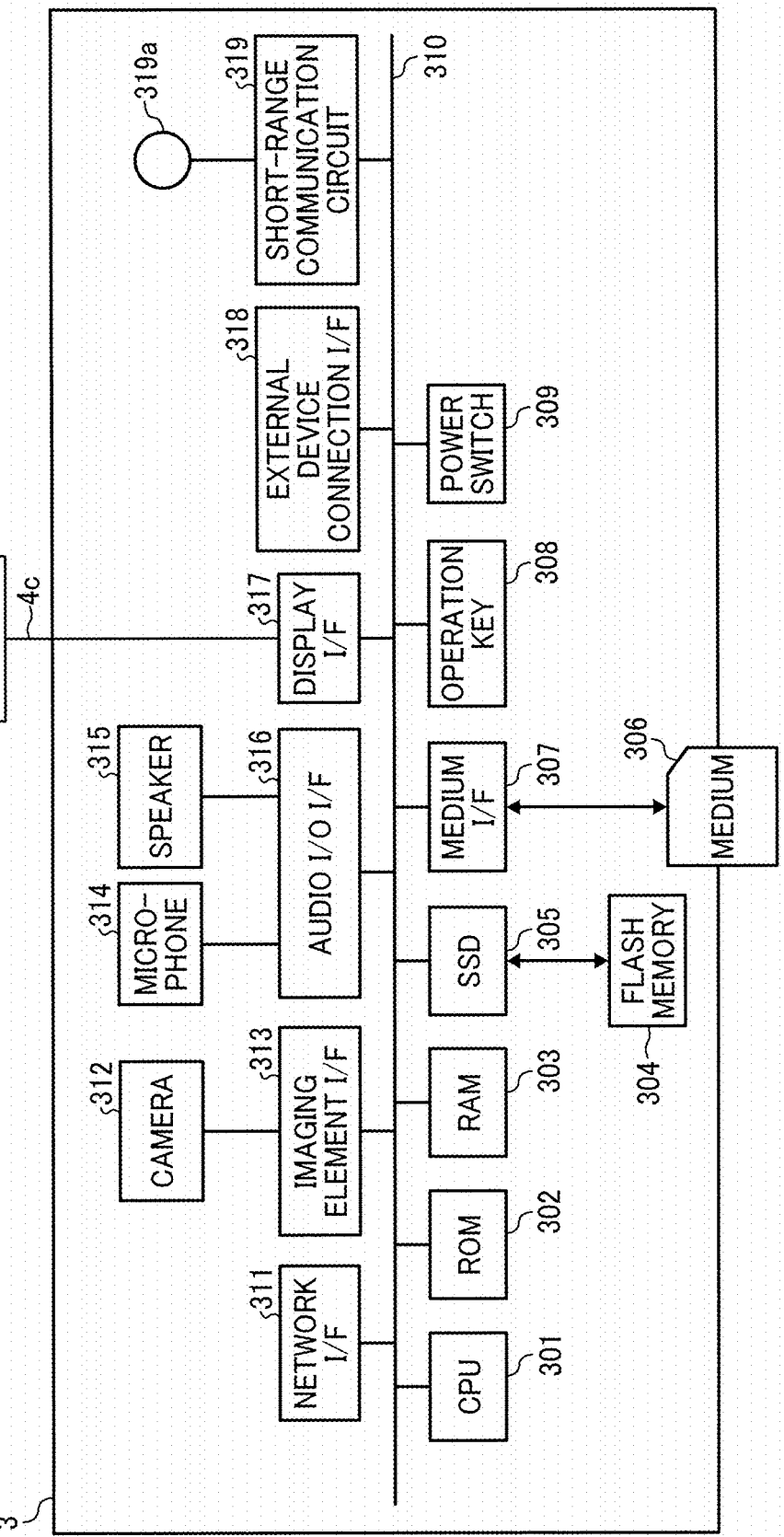
FIG. 10 is a block diagram illustrating a hardware configuration of a videoconference terminal, according to an embodiment of the present disclosure.

Hereinafter, a description is given of a hardware configuration of the videoconference terminal 3 with reference to FIG. 10. FIG. 10 is a block diagram illustrating a hardware configuration of the videoconference terminal 3. As illustrated in FIG. 10, the videoconference terminal 3 includes a CPU 301, a ROM 302, a RAM 303, a flash memory 304, a solid state drive (SSD) 305, a medium I/F 307, an operation key 308, a power switch 309, a bus line 310, a network I/F 311, a camera 312, an imaging element I/F 313, a microphone 314, a speaker 315, an audio input/output (I/O) I/F 316, a display I/F 317, an external device connection I/F 318, a short-range communication circuit 319, and an antenna 319a for the short-range communication circuit 319.

The CPU 301 controls entire operation of the videoconference terminal 3. The ROM 302 stores a control program such as an Initial Program Loader (IPL) to boot the CPU 301. The RAM 303 is used as a work area for the CPU 301. The flash memory 304 stores various data such as a communication control program, image data, and audio data. The SSD 305 controls reading and writing of various data from and to the flash memory 304 under control of the CPU 301. In alternative to the SSD, a hard disc drive (HDD) can be used. The medium I/F 307 controls reading and writing (storing) of data from and to a storage medium 306 such as a flash memory. The operation key (keys) 308 is operated by a user to input a user instruction such as a user selection of a destination of communication from the videoconference terminal 3. The power switch 309 is a switch that turns on or off the power of the videoconference terminal 3.

The network I/F 311 in an interface that controls communication of data between the videoconference terminal 3 and extraneous sources through the communication network 100 such as the Internet. The camera 312 is an example of a built-in imaging device configured to capture a subject under control of the CPU 301 to obtain image data. The imaging element I/F 313 is a circuit that controls driving of the camera 312. The microphone 314 is an example of a built-in audio collecting device configured to input audio. The audio input/output I/F 316 is a circuit for controlling input and output of audio signals between the microphone 314 and the speaker 315 under control of the CPU 301. The display I/F 317 is a circuit for transmitting image data to the display 4, which is external to the videoconference terminal 3, under control of the CPU 301. The external device connection I/F 318 is an interface that connects the videoconference terminal 3 to various external devices. The short-range communication circuit 319 is a communication circuit that establish communication in compliance with the NFC (registered trademark), the Bluetooth (registered trademark) and the like.

The bus line 310 is an address bus, a data bus or the like, which electrically connects the constituent elements illustrated in FIG. 10 such as the CPU 301.

The display 4 is an example of a display device that displays an image of a subject, an operation icon, etc. The display 4 is configured as a liquid crystal display or an organic electroluminescence (EL) display, for example. The display 4 is connected to the display I/F 317 by a cable 40c. For example, the cable 40c is an analog red green blue (RGB) (video graphic array (VGA)) signal cable, a component video cable, a high-definition multimedia interface (HDMI) (registered trademark) signal cable, or a digital video interactive (DVI) signal cable.

The camera 312 includes a lens and a solid-state imaging element that converts an image (video image) of subject to electronic data by photoelectric conversion. Examples of the solid-state imaging element include a CMOS sensor and a CCD sensor. The external device connection I/F 318 is configured to connect the videoconference terminal 3 to extraneous sources such as an external camera, an external microphone, or an external speaker through a USB cable or the like. When an external camera is connected, the external camera is driven in preference to the built-in camera 312 under control of the CPU 301. Similarly, when an external microphone is connected, or an external speaker is connected, the external microphone or the external speaker is driven in preference to the built-in microphone 314 or the built-in speaker 315 under control of the CPU 301.

The storage medium 306 is removable from the videoconference terminal 3. In addition to or in alternative to the flash memory 304, any suitable nonvolatile memory, such as an electrically erasable and programmable ROM (EEPROM) can be used, provided that it reads or writes data under control of CPU 301.

<Hardware Configuration of Communication Management System 5 and PC 7>

Figure 11:
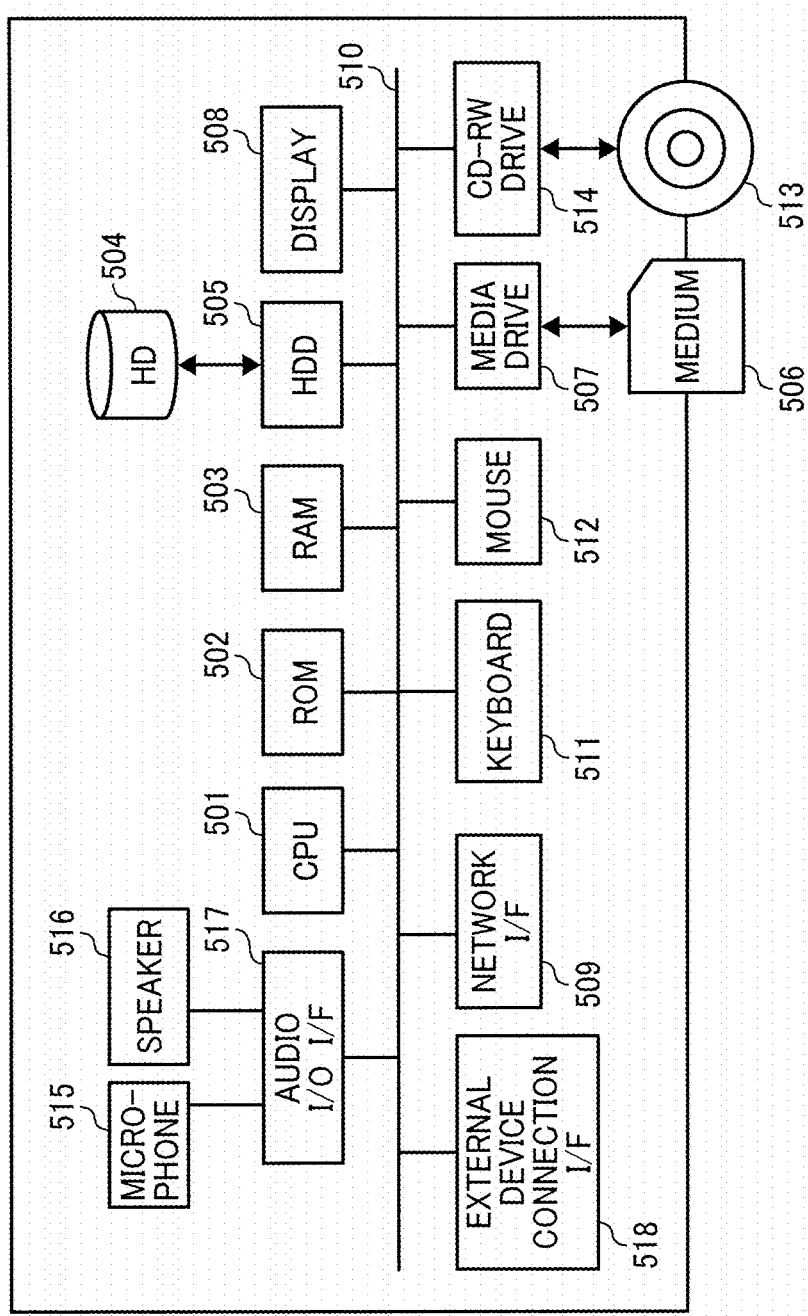
FIG. 11 is a block diagram illustrating a hardware configuration of any one of a communication management system and a personal computer (PC), according to an embodiment of the present disclosure.

Next, referring to FIG. 11, a hardware configuration of each of the communication management system 5 and the PC 7 is described, according to the embodiment. FIG. 11 is a block diagram illustrating an example of the hardware configuration of any one of the communication management system 5 and the PC 7. In the embodiment, the communication management system 5 and the PC 7 are individually implemented by a computer. Therefore, a description is first given of a configuration of the communication management system 5. Further, with respect to a hardware configuration of the PC 7, a description is given of elements that the PC 7 additionally includes.

The communication management system 5 includes a CPU 501, a ROM 502, a RAM 503, a hard disc (HD) 504, an HDD 505, a media drive 507, a display 508, a network I/F 509, a keyboard 511, a mouse 512, a compact disc rewritable (CD-RW) drive 514, and a bus line 510. The CPU 501 controls entire operation of the communication management system 5. The ROM 502 stores a control program such as an IPL to boot the CPU 501. The RAM 503 is used as a work area for the CPU 501. The HD 504 stores various types of data, such as a control program for the communication management system 5. The HDD 505 controls reading and writing of various data from and to the HD 504 under control of the CPU 501. The media drive 507 controls reading and writing (storing) of data from and to a storage medium 506 such as a flash memory. The display 508 displays various information such as a cursor, menu, window, characters, or image. The network I/F 509 is an interface that controls communication of data between the communication management system 5 and extraneous sources through the communication network 100. The keyboard 511 includes a plurality of keys to allow a user to input characters, numerals, or various instructions. The mouse 512 allows a user to select a specific instruction or execution, select a target for processing, or move a cursor being displayed. The CD-RW drive 514 controls reading or writing of various data to and from a CD-RW 513, which is one example of a removable storage medium. The bus line 510 is an address bus, a data bus or the like, which electrically connects the above-described constituent elements, as illustrated in FIG. 11.

A description is given hereinafter of hardware elements that the PC 7 includes in addition to the elements that the communication management system 5 includes.

The PC 7 includes a microphone 515, a speaker 516, an audio input/output I/F 517, and an external device connection I/F 518. The microphone 515 and the speaker 516 are connected to the audio input/output I/F 517. This allows the PC 7 to communicate audio data with the videoconference terminals 3a to 3f via the network I/F 509. To the external device connection I/F 518, the image capturing device 1a and the head-mounted display terminal 8 are communicably connected. The PC 7 performs video communication with the videoconference terminals 3a to 3f through the network I/F 509.

<Hardware Configuration of Smartphone>

Figure 12:
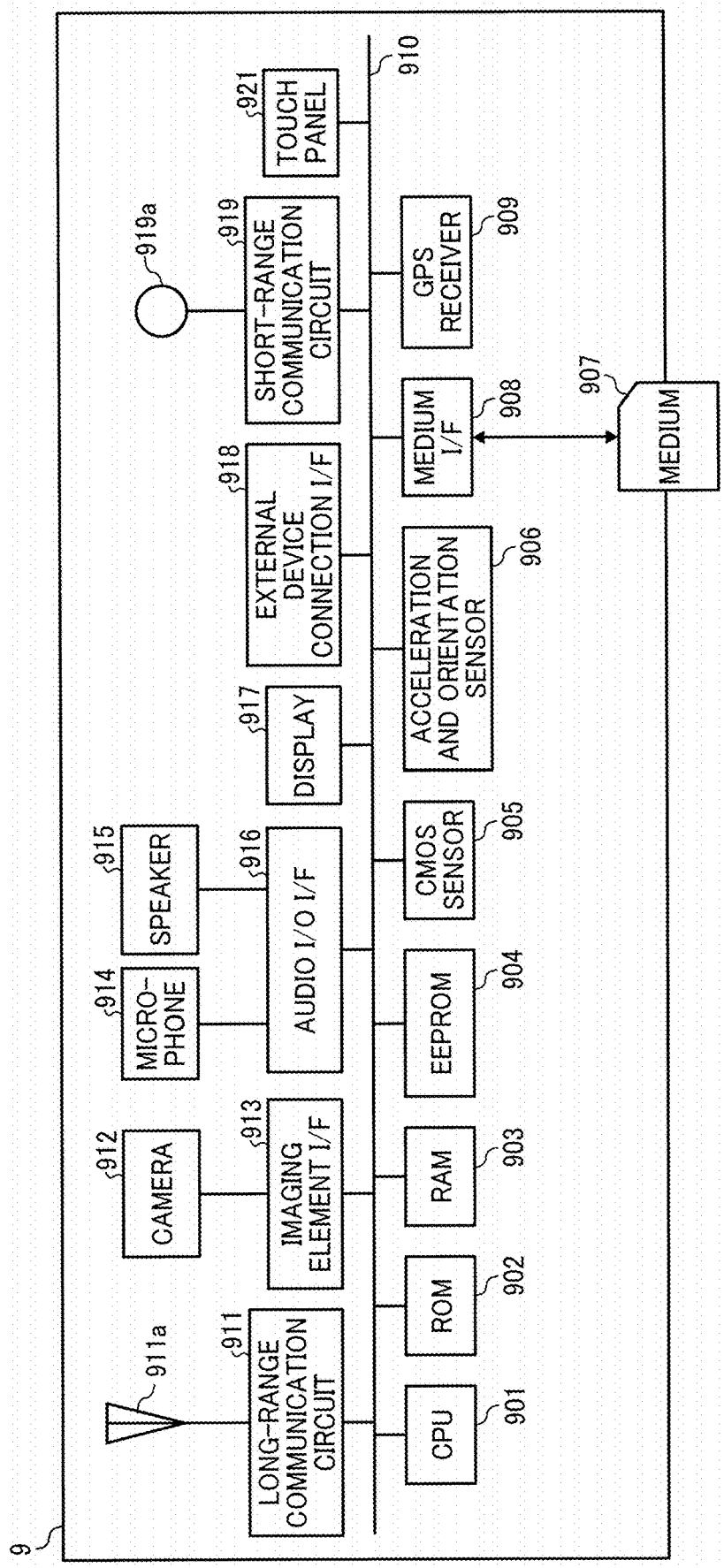
FIG. 12 is a block diagram illustrating a hardware configuration of a smartphone, according to an embodiment of the present disclosure.

The PC 7 (communication terminal) and the head-mounted display terminal 8 constitutes the VR terminal. A combination of the PC 7 (communication terminal) and the head-mounted display terminal 8 can be replaced with one smartphone. Referring to FIG. 12, a hardware configuration of a smartphone 9 is described, according to the embodiment. FIG. 12 is a block diagram illustrating a hardware configuration of the smartphone 9, according to the embodiment. As illustrated in FIG. 12, the smartphone 9 includes a CPU 901, a ROM 902, a RAM 903, an EEPROM 904, an imaging element I/F 913a, a CMOS sensor 905, an acceleration and orientation sensor 906, a medium I/F 908, and a global positioning system (GPS) receiver 909.

The CPU 901 controls entire operation of the smartphone 9. The ROM 902 stores a control program such as an IPL to boot the CPU 901. The RAM 903 is used as a work area for the CPU 901. The EEPROM 904 reads or writes various data such as a control program for a smartphone under control of the CPU 901. The CMOS sensor 905 captures an object (mainly, a self-image of a user operating the smartphone 9) under control of the CPU 901 to obtain image data. The imaging element I/F 913 is a circuit that controls driving of the CMOS sensor 905. The acceleration and orientation sensor 906 includes various sensors such as an electromagnetic compass for detecting geomagnetism, a gyrocompass, and an acceleration sensor. The medium I/F 908 controls reading and writing of data from and to a storage medium 907 such as a flash memory. The GPS receiver 909 receives GPS signals from a GPS satellite.

The smartphone 9 further includes a long-range communication circuit 911, a CMOS sensor 912, an imaging element I/F 913, a microphone 914, a speaker 915, an audio input/output I/F 916, a display 917, an external device connection I/F 918, a short-range communication circuit 919, an antenna 919a for the short-range communication circuit 919, and a touch panel 921.

The long-range communication circuit 911 is a circuit that allows the smartphone 9 to communicate with extraneous sources through the communication network 100. The CMOS sensor 912 is an example of a built-in imaging device configured to capture a subject under control of the CPU 901 to obtain image data. The imaging element I/F 913 is a circuit that controls driving of the CMOS sensor 912. The microphone 914 is an example of a built-in audio collecting device configured to input audio. The audio input/output I/F 916 is a circuit for controlling input and output of audio signals between the microphone 914 and the speaker 915 under control of the CPU 901. The display 917 is an example of a display device that displays an image of a subject, various icons, etc. The display 917 is configured as a liquid crystal display or an organic EL display, for example. In this case, the display 917 of the smartphone 9 is divided into two areas instead of display units 808L and 808R described later referring to FIG. 13 of the head-mounted display terminal 8.

The external device connection I/F 918 is an interface that connects the smartphone 9 to various external devices. The short-range communication circuit 919 is a communication circuit that establish communication in compliance with the NFC, the Bluetooth and the like. The touch panel 921 is an example of an input device that allows a user to operate the smartphone 9 by touching a screen of the display 917.

The smartphone 9 further includes a bus line 910. The bus line 910 is an address bus, a data bus or the like, which electrically connects the constituent elements in FIG. 12 such as the CPU 901.

In addition, a storage medium such as a CD-ROM or a hard disc storing any of the above-described programs can be distributed domestically or overseas as a program product.

<Hardware Configuration of Head-Mounted Display Terminal 8>

Figure 13:
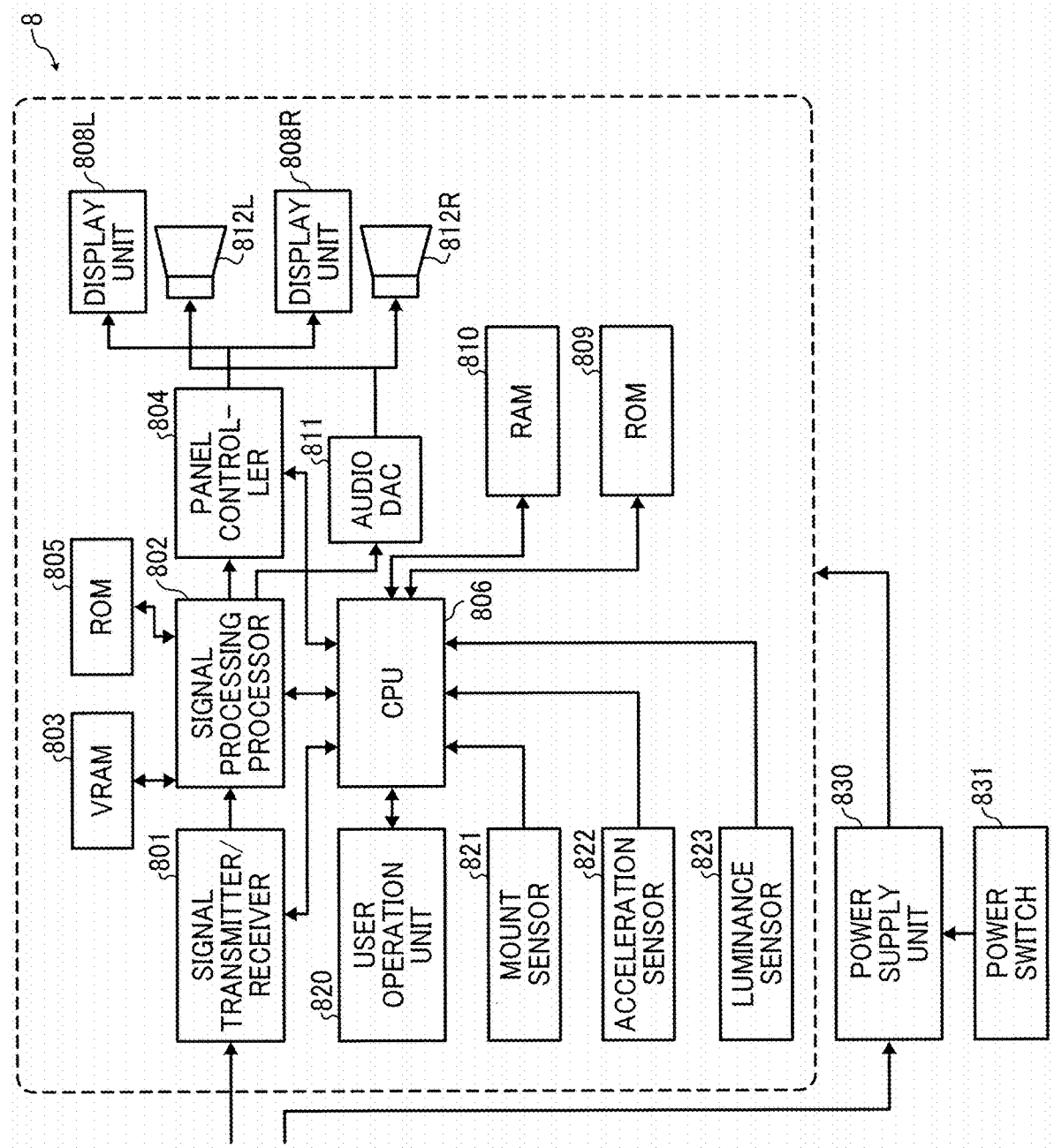
FIG. 13 is a block diagram illustrating a configuration of a head-mounted display, according to an embodiment of the present disclosure.

FIG. 13 is a block diagram illustrating a hardware configuration of the head-mounted display terminal 8, according to the embodiment. The head-mounted display terminal 8 includes a signal transmitter/receiver 801, a signal processor 802, a video random access memory VRAM 803, a panel controller 804, a ROM 805, a CPU 806, a right display unit 808R, a left display unit 808L, a ROM 809, a RAM 810, an audio digital to analog converter (DAC) 811, a right speaker 812R, a left speaker 812L, a user operation unit 820, a mount sensor 821, an acceleration sensor 822, and a luminance sensor 823. Further, the head-mounted display terminal 8 includes a power supply unit 830 for supplying power and a power switch 831 for switching power supply to the power supply unit 830.

The signal transmitter/receiver 801 receives an audiovisual (AV) signal and transmits data signals processed by the CPU 806 via a cable connected to the external device connection I/F 518 of the PC 7 illustrated in FIG. 11. In the present embodiment, since the AV signal is transferred in a serial transfer mode, the signal transmitter/receiver 801 performs serial/parallel conversion of the received signals.

The signal processor 802 separates the AV signal received by the signal transmitter/receiver 801 into a video signal and an audio signal and performs video signal processing and audio signal processing on the video signal and the audio signal, respectively.

The signal processor 802 performs image processing such as luminance level adjustment, contrast adjustment, or any other processing for improving image quality.

Further, the signal processor 802 applies various processing to an original video signal according to instructions from the CPU 806. For example, the signal processor 802 generates on-screen display (OSD) information including at least one of characters and figures and superimposes the OSD information on the original video signal. A ROM 805 stores a signal pattern required for generating OSD information, and the signal processor 802 reads out the data stored in the ROM 805.

Examples of the OSD information to be superimposed on the original video information include a graphical user interface (GUI) that allows a user to adjust output of a screen and sound. Screen information generated through the video signal processing is temporarily stored in the VRAM 803. When the video signal supplied from the external device connection I/F 518 of the PC 7 is stereoscopic video signals including a left video signal and a right video signal, the signal processor 802 separates the video signal into the left video signal and the right video signal to generate the screen information.

Each of the left display unit 808L and the right display unit 808R includes a display panel implemented by organic EL elements, a gate driver for driving the display panel, and a data driver. Each of the left display unit 808L and the right display unit 808R further includes an optical system having a wide viewing angle. However, the optical system is omitted in FIG. 13.

The panel controller 804 reads the screen information from the VRAM 803 at every predetermined display cycle and converts the read-out screen information into signals to be input to the left display unit 808L and the right display unit 808R. Further, the panel controller generates a pulse signal such as a horizontal synchronization signal and a vertical synchronization signal used for operation of the gate driver and the data driver.

The CPU 806 executes a program loaded from the ROM 809 into the RAM 810 to perform entire operation of the head-mounted display terminal 8. Further, the CPU 806 controls transmission and reception of data signals to and from the external device connection I/F 518 of the PC 7 via the signal transmitter/receiver 801.

A main unit of the head-mounted display terminal 8 includes a user operation unit 820. The user operation unit 820 includes one or more operation elements operated by a user with his or her finger or the like. The operation elements are implemented by, for example a combination of up, down, left and right cursor keys and an enter key provided in the center of the cursor keys. In the present embodiment, the user operation unit 820 further include a "+" button for increasing the volume of the left speaker 812L and the right speaker 812R and a "−" button for lowering the volume of the headphones. The CPU 806 instructs the signal processor 802 to perform processing for video output from the right display unit 808R and the left display unit 808L, audio output from the left speaker 812L and the right speaker 812R in accordance with a user instruction input from the user operation unit 820. Further, in response to receiving, from the user operation unit 820, an instruction relating to content reproduction such as reproduction, stop, fast forward, and fast rewind, the CPU 806 causes the signal transmitter/receiver 801 to transmit a data signal for notifying the instruction contents to the external device connection I/F 518 of the PC 7.

Further, in the present embodiment, the head-mounted display terminal 8 includes a plurality of sensors such as the mount sensor 821, the acceleration sensor 822, and the luminance sensor 823. Outputs from these sensors are input to the CPU 806.

The mount sensor 821 is implemented by, for example, a mechanical switch. The CPU 806 determines whether a user is wearing the head-mounted display terminal 8 based on an output from the mount sensor 821, that is, whether the head-mounted display terminal 8 is currently in use.

The acceleration sensor 822 includes three axes, for example, and detects the magnitude and direction of acceleration applied to the head-mounted display terminal 8. The CPU 806 tracks the movement of a head of a user wearing the head-mounted display terminal 8 based on the acquired acceleration information.

The luminance sensor 823 detects the brightness of an environment where the head-mounted display terminal 8 is currently located. The CPU 806 can control luminance level adjustment applied to the video signal based on the luminance information acquired by the luminance sensor 823.

In addition, the CPU 806 also causes the signal transmitter/receiver 801 to transmit the sensor information acquired from each of the mount sensor 821, the acceleration sensor 822 and the luminance sensor 823 to the external device connection I/F 518 of the PC 7 as needed.

The power supply unit 830 supplies driving power supplied from the PC 7 to each of the circuit components surrounded by a broken line in FIG. 13. Further, the main unit of the head-mounted display terminal 8 includes the power switch 831, which a user can operate with his or her finger. In response to operation to the power switch 831, the power supply unit 830 switches on and off of power supply to the circuit components.

A state in which the power is off in response to operation to the power switch 831 corresponds to a "standby" state of the head-mounted display terminal 8, in which the power supply unit 830 is on standby in a power supply state. The PC 7 determines, based on variations in a voltage level of a signal line connected to the power supply unit 830, whether each of the circuit components is currently in-use or non-use, the in-use being a state where each of the circuit components is operating with power being supplied.

Functional Configuration of Embodiment:

Referring to FIGS. 14A to 14C to FIG. 21, a functional configuration of the present embodiment is described.

<Functional Configuration of Image Capturing Device 1> capturing device 1 is described. As illustrated in FIG. 14B, the image capturing device 1 includes a receiving unit 12, an image capturing unit 13, an audio collecting unit 14, a communication unit 18, and a data storage/read unit 19. These units are functions or means that are implemented by or that are caused to function by operating any of the constituent elements illustrated in FIG. 9 in cooperation with the instructions of the CPU 111 according to the image capturing device control program expanded from the SRAM 113 to the DRAM 114.

The image capturing device 1 further includes a memory 1000, which is implemented by the ROM 112, the SRAM 113, or the DRAM 114 illustrated in FIG. 9. The memory 1000 stores therein a globally unique identifier (GUID) identifying the own device (i.e., the image capturing device 1 itself).

Each Functional Unit of Image Capturing Device 1:

Referring to FIG. 9 and FIG. 14B, each of the functional units of the image capturing device 1 is described in detail.

The receiving unit 12 of the image capturing device 1 is mainly implemented by the operation unit 115 illustrated in FIG. 9, which operates under control of the CPU 111. The receiving unit 12 receives an instruction input from the operation unit 115 according to a user operation.

The image capturing unit 13 is implemented mainly by the imaging unit 101, the image processing unit 104, and the imaging control unit 105, illustrated in FIG. 9, each of which operates under control of the CPU 111. The image capturing unit 13 captures an image of an object or surroundings to obtain captured-image data.

The audio collecting unit 14 is mainly implemented by the microphone 108 and the audio processing unit 109 illustrated in FIG. 9, each of which operates under control of the CPU 111. The audio collecting unit 14 collects sounds around the image capturing device 1.

The communication unit 18, which is mainly implemented by instructions of the CPU 111, communicates data with a communication unit 38 of the videoconference terminal 3 using a short-range wireless communication network in compliance with the NFC standard, Bluetooth (registered trademark), or Wi-Fi, for example.

The data storage/read unit 19, which is mainly implemented by instructions of the CPU 111 illustrated in FIG. 9, stores various data or information in the memory 1000 and reads out various data or information from the memory 1000.

<Functional Configuration of Videoconference Terminal 3>

Figure 14A:
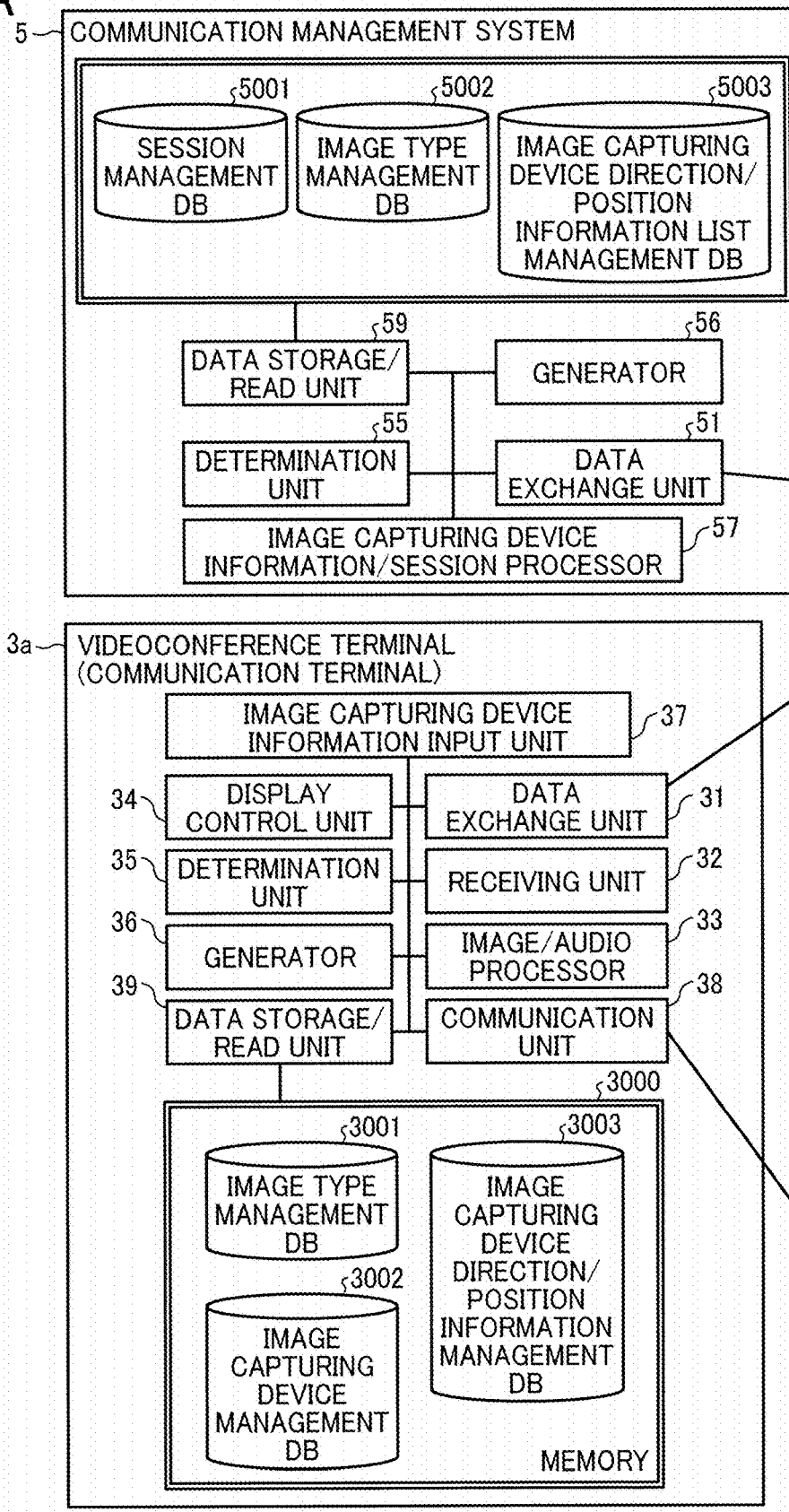
FIG. 14A, FIG. 14B and FIG. 14C are a block diagram illustrating a functional configuration of the image communication system, according to an embodiment of the present disclosure.
Figure 14B:
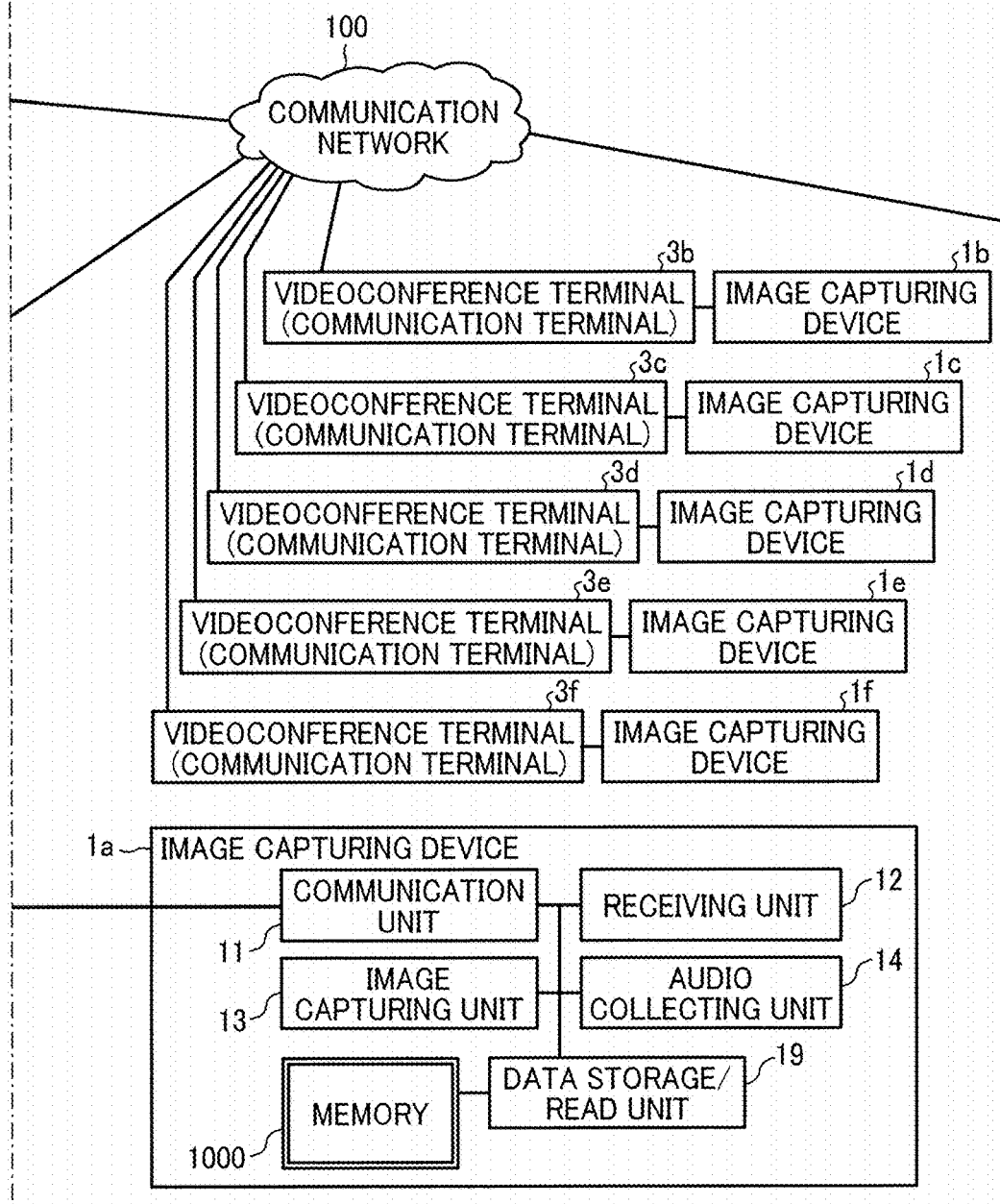

Next, referring to FIG. 10 and FIG. 14A, a functional configuration of the videoconference terminal 3 is described. The functional configuration of the videoconference terminal 3a is illustrated in FIG. 14B. Since each of the other videoconference terminals 3b to 3f has the same or substantially the same configuration of the videoconference terminal 3a, the redundant descriptions thereof are omitted to simplify the description.

As illustrated in FIG. 14B, the videoconference terminal 3 includes a data exchange unit 31, a receiving unit 32, an image/audio processor 33, a display control unit 34, a determination unit 35, a generator 36, an image capturing device position information input unit 37, a communication unit 38, and a data storage/read unit 39. These units are functions or means that are implemented by or that are caused to function by operating any of the constituent elements illustrated in FIG. 10 in cooperation with instructions from the CPU 301 according to a control program for the videoconference terminal 3, expanded from the flash memory 304 to the RAM 303.

The videoconference terminal 3 further includes a memory 3000, which is implemented by the ROM 302, the RAM 303, and the flash memory 304 illustrated in FIG. 10. The memory 3000 includes an image type management database (DB) 3001, an image capturing device management DB 3002, and an image capturing device direction/position management DB 3003. Among these DBs, the image type management DB 3001 is implemented by an image type management table as illustrated in FIG. 15. The image capturing device management DB 3002 is implemented by an image capturing device management table as illustrated in FIG. 16. The image capturing device direction/position management DB 3003 is implemented by an image capturing device direction/position information management table as illustrated in FIG. 17.

Image Type Management Table:

FIG. 15 is an illustration of an example data structure of the image type management table, according to the embodiment. The image type management table stores an image data identifier (ID), an internet protocol (IP) address, which is an example of an address of a terminal as a transmission source of image data, and a source name, in association with one another. The terminal as a transmission source is hereinafter referred to as a "sender terminal". The image data ID is one example of image data identification information identifying image data to be used in video communication. The same image data ID is assigned to image data transmitted from the same sender terminal. By using the image data ID, a destination terminal (that is, a communication terminal that receives image data) identifies a sender terminal from which the received image data is transmitted. The IP address of the sender terminal is an IP address of a communication terminal that transmits image data identified by the corresponding image data ID, which is associated with the IP address. The source name, which is associated with a specific image data ID, is a name for identifying an image capturing device that outputs the image data identified by that image data ID associated with the source name. The source name is one example of image type information. The source name is a name generated by a communication terminal such as the videoconference terminal 3a according to a predetermined naming rule.

The example of the image type management table illustrated in FIG. 15 indicates that five communication terminals, whose IP addresses are respectively "1.2.1.3", "1.2.2.3", "1.3.1.3", "1.2.1.4" and "1.3.1.4" transmit image data identified by the image data ID "RS001", "RS002", "RS003", "RS004" and "RS005", respectively. Further, according to the image type management table illustrated in FIG. 15, the image types represented by the source names of those five communication terminals are "Video_Theta", "Video_Theta", "Video", "Video" and "Video_Theta" that indicate the image types, which are "special image", "special image", "general image", "general image", and "special image", respectively. In the embodiment, the "special image" is a spherical panoramic image.

In another example, data other than the image data are stored in the image type management table in association with the image data ID. Examples of the data other than the image data include audio data and presentation material data to be shared on a screen. In addition, data other than the image data may be stored in the image type management table in association with the image data ID. Examples of the data other than the image data include audio data and presentation material data to be shared on a screen.

Image Capturing Device Management Table:

FIG. 16 is an illustration of an example data structure of the image capturing device management table. The image capturing device management table stores a vendor ID and a product ID among the GUIDs of an image capturing device that is configured to obtain two hemispherical images, from which a spherical panoramic image is generated. As the GUID, a combination of a vendor ID (VID) and a product ID (PID) used in a USB device is used, for example. The vendor ID and the product ID are stored in a communication terminal such as a videoconference terminal before shipment. In another example, these IDs are added and stored in the communication terminal after shipment.

Direction/Position Information Management Table:

FIG. 17 is an illustration of an example data structure of the image capturing device direction/position information management table, stored in the videoconference terminal 3. The image capturing device direction/position information management table stores direction/position information of the image capturing device including information that is input by the commentator and information acquired from the image capturing device management DB 3002 of the videoconference terminal 3 after the input of the information by the commentator. The direction/position information of the image capturing device information is information associating the image data ID, an upper left corner position (Top, Left) in the virtual space, a lower right corner position (Bottom, Right) in the virtual space, display directions (θ, φ) in the head-mounted display terminal 8, and mapping positions (x, y, z) of the head-mounted display terminal 8 in the virtual space. From among these information items, the image data ID is an image ID acquired from the image capturing device management DB 3002.

Figure 28:
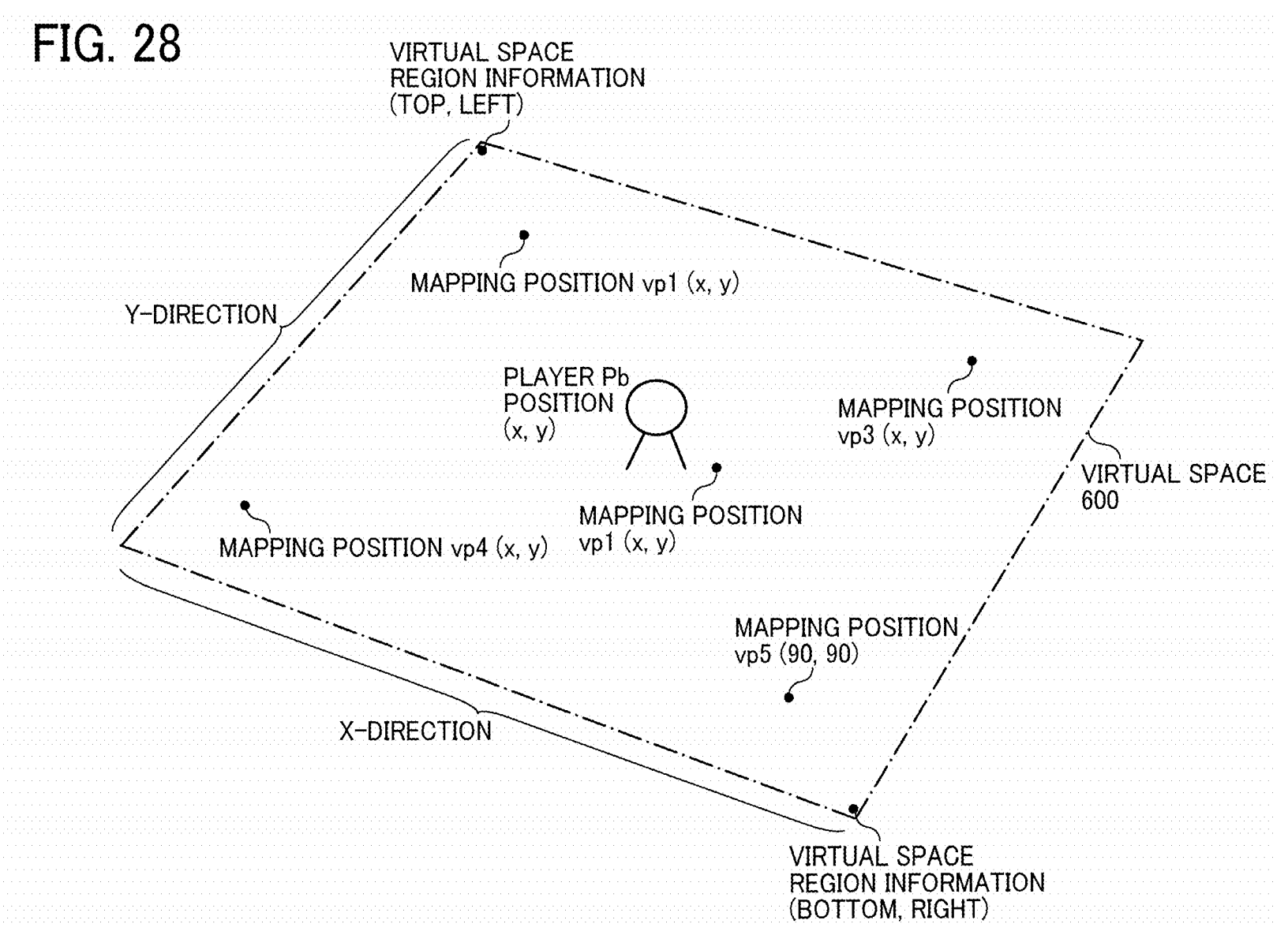

As illustrated in FIG. 28, the virtual space Top indicates the top of a region of the virtual space in which the position of the image capturing device 1 is mapped. It is sufficient that any one of the five videoconference terminals participating in a session sets a value of the virtual space Top. Even when two or more videoconference terminals set values, a process of acquiring the maximum region is performed.

The virtual space Left indicates the left of the region of the virtual space in which the position of the image capturing device 1 is mapped. It is sufficient that any one of the five participating videoconference terminals sets a value of the virtual space Left. Even when two or more videoconference terminals set values, a process of acquiring the maximum region is performed.

The virtual space Bottom indicates the bottom of the region of the virtual space in which the position of the image capturing device 1 is mapped. It is sufficient that any one of the five participating videoconference terminals sets a value of the virtual space Bottom. Even when two or more videoconference terminals set values, a process of acquiring the maximum region is performed.

The virtual space Right indicates the right of the region of the virtual space in which the position of the image capturing device 1 is mapped. It is sufficient that any one of the five participating videoconference terminals sets a value of the virtual space Right. Even when two or more videoconference terminals set values, a process of acquiring the maximum region is performed.

In the virtual space defined by the upper left corner position (Top, Left) and the lower right corner position (Bottom, Right), the position of the videoconference terminal 3 connected to the image capturing device 1 can be mapped, instead of the position of the image capturing device 1.

Figure 30:
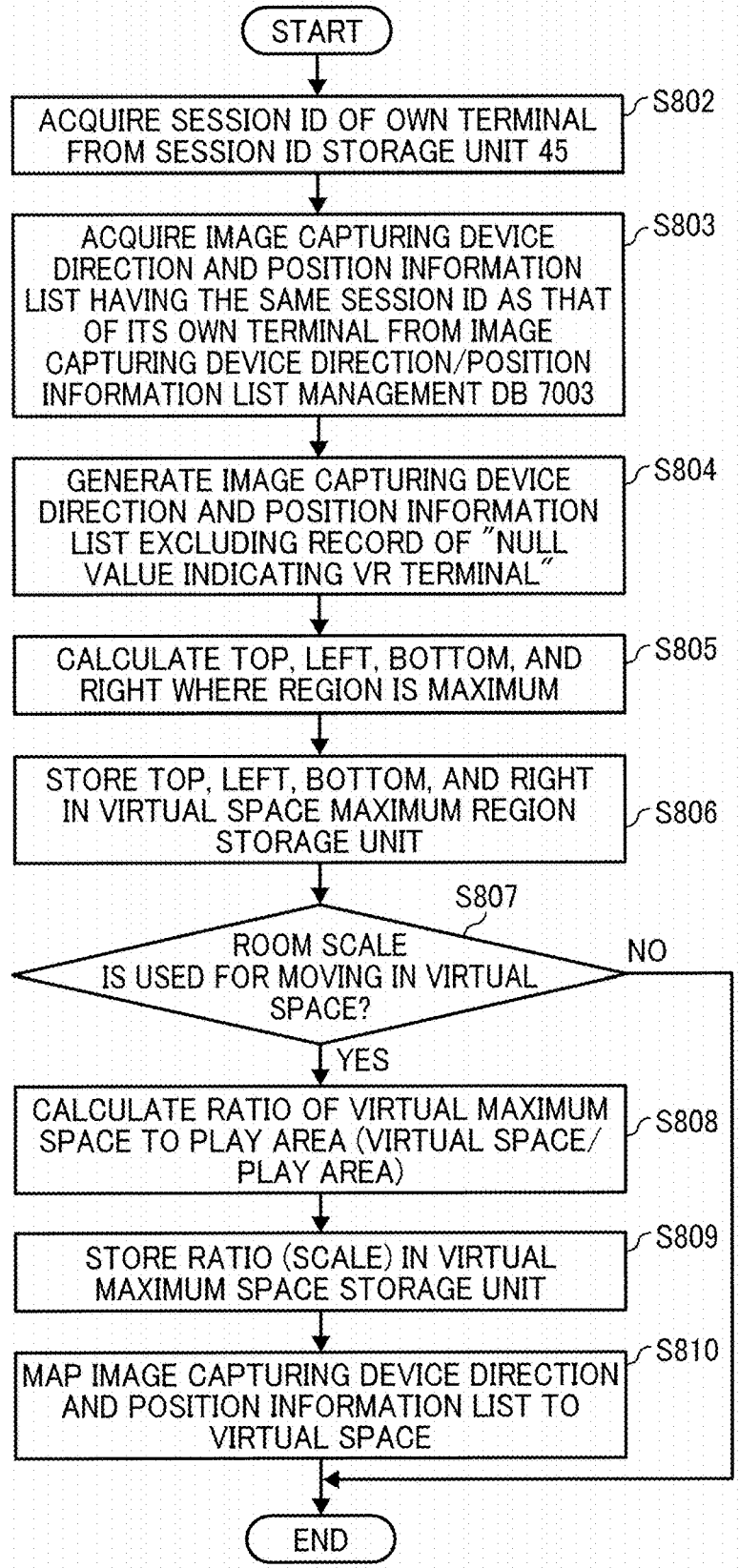
FIG. 30 is a flowchart illustrating an operation performed by a mapping unit, according to an embodiment of the present disclosure.

The direction θ (polar angle) indicates an imaging direction θ of the image capturing device 1 (see FIG. 6 and FIG. 30). The direction φ (azimuth angle) indicates an imaging direction φ of the image capturing device 1 (see FIG. 6 and FIG. 30).

The mapping position x indicates the position of an X-axis when the position of the image capturing device 1 in the exhibition venue of the real space is mapped to the virtual space. The mapping position y indicates the position of a Y-axis when the position of the image capturing device 1 in the exhibition venue of the real space is mapped to the virtual space. The mapping position z indicates the position of a Z-axis when the position of the image capturing device 1 in the exhibition venue of the real space is mapped to the virtual space. Hereinafter, it is assumed that the mapping position Z is always zero, and the description thereof is omitted.

In the items from the virtual space Top to the mapping position z, values are input when there is the videoconference terminal 3 and the image capturing device 1 that perform video distribution in the exhibition venue. In a case of a participant side such as the VR terminal, a special value is stored in order to identify the participant side terminal as a terminal that is not in the exhibition venue. For example, a null value can be entered as indicated in a record corresponding to a session ID "se101" and an image data ID "RS003" in a table of FIG. 20.

Each Functional Unit of Videoconference Terminal 3:

Referring to FIG. 10 and FIG. 14A, each of the functional units of the videoconference terminal 3 is described in detail.

The data exchange unit 31 of the videoconference terminal 3 is mainly implemented by the network I/F 311 illustrated in FIG. 10, which operates under control of the CPU 301. The data exchange unit 31 exchanges various data or information with communication management system 5 via the communication network 100.

The receiving unit 32 is mainly implemented by the operation key 308, which operates under control of the CPU 301. The receiving unit 32 receives selections or inputs according to a user operation. In another example, an input device such as a touch panel is used in addition to or in place of the operation key 308.

The image/audio processor 33, which is implemented by instructions of the CPU 301, processes image data obtained by capturing a subject by the camera 312. After voice sound of a user is converted to audio signals by the microphone 314, the image/audio processor 33 performs processing on audio data corresponding to the audio signals.

Further, the image/audio processor 33 processes image data received from another communication terminal based on the image type information such as the source name. The display control unit 34 causes the display 4 to display an image based on the processed image data. More specifically, when the image type information indicates "special image", the image/audio processor 33 converts the image data such as hemispherical image data as illustrated in FIG. 3A and FIG. 3B into spherical panoramic image data to generate a spherical panoramic image as illustrated in FIG. 4B. Further, the image/audio processor 33 generates the predetermined-area image. Furthermore, the image/audio processor 33 outputs, to the speaker 315, audio signals according to audio data received from another communication terminal via the communication management system 5. The speaker 315 outputs sound based on the audio signal.

The display control unit 34 is mainly implemented by the display I/F 317, which operates under control of the CPU 301. The display control unit 34 causes the display 4 to display various images or characters.

The determination unit 35, which is mainly implemented by instructions of the CPU 301, determines an image type corresponding to image data received from, for example, the image capturing device 1a.

The generator 36 is mainly implemented by instructions of the CPU 301. The generator 36 generates a source name, which is one example of the image type information, according to the above-described naming rule, based on a determination result obtained by the determination unit 35 indicating one of a general image and a special image (the "special image" is a spherical panoramic image, in the embodiment). For example, when the determination unit 35 determines that the image type is a general image, the generator 36 generates a source name of "Video" that indicates a general image type. By contrast, when the determination unit 35 determines that the image type is a special image, the generator 36 generates a source name of "Video_Theta" that indicates a special image type.

The image capturing device position information input unit 37 includes a processing unit for allowing the commentator Ca to the commentator Cf or the constructor Ea to enter the virtual space Top, the virtual space Bottom, the virtual space Right, the direction θ (polar angle), the direction φ (azimuth angle), the mapping position x, the mapping position y, and the mapping position z in the image capturing device direction/position management DB 3003 by using the operation key 308 and the display 4 illustrated in FIG. 10.

The communication unit 38 is mainly implemented by the short-range communication circuit 319 and the antenna 319a, each of which operates under control of the CPU 301. The communication unit 38 communicates with the communication unit 18 of the image capturing device 1 using the short-range wireless communication network in compliance with the NFC standard, Bluetooth (registered trademark), or Wi-Fi, for example. In the above description, the communication unit 38 and the data exchange unit 31 individually have a communication unit. In another example, the communication unit 38 and the data exchange unit 31 share a single communication unit.

The data storage/read unit 39, which is mainly implemented by instructions of the CPU 301 illustrated in FIG. 11, stores various data or information in the memory 3000 and reads out various data or information from the memory 3000.

<Functional Configuration of Communication Management System 5>

Next, referring to FIG. 11 and FIG. 14A, a functional configuration of the communication management system 5 is described. The communication management system 5 includes a data exchange unit 51, a determination unit 55, a generator 56, an image capturing device position information/session processor 57 and a data storage/read unit 59. These units are functions or means that are implemented by or that are caused to function by operating any of the constituent elements illustrated in FIG. 11 in cooperation with instructions from the CPU 501 according to a control program for the communication management system 5, expanded from the HD 504 to the RAM 503.

The communication management system 5 further includes a memory 5000, which is implemented by the RAM 503 and the HD 504 illustrated in FIG. 11. The memory 5000 includes a session management DB 5001, an image type management DB 5002, and an image capturing device direction/position information list management DB 5003. The session management DB 5001 is implemented by a session management table as illustrated in FIG. 18. The image type management DB 5002 is implemented by an image type management table as illustrated in FIG. 19. The image capturing device direction/position information list management DB 5003 is implemented by an image capturing device direction/position information list management table as illustrated in FIG. 20.

Session Management Table:

FIG. 18 is an illustration of an example data structure of the session management table. The session management table stores a session ID and an IP address of a participant communication terminal, in association with each other. The session ID is one example of session identification information for identifying a session that implements video communication. Each session ID is generated for a corresponding virtual conference room. One or more session IDs are also stored and managed in each communication terminal, such as the videoconference terminal 3a, to be used by each communication terminal to select a communication session. The IP address of the participant communication terminal indicates an IP address of each of the communication terminal(s) participating in a virtual conference room identified by an associated session ID.

Image Type Management Table:

FIG. 19 is an illustration of an example data structure of the image type management table. The image type management table illustrated in FIG. 19 stores, in addition to the information items stored in the image type management table illustrated in FIG. 15, the same session IDs as those stored in the session management table, in association with one another. The example of the image type management table illustrated in FIG. 19 indicates that six communication terminals whose IP addresses are "1.2.1.3", "1.2.2.3", "1.3.1.3", "1.2.1.4", "1.3.1.4", and "1.7.1.4" are participating in the virtual conference room identified by the session ID "se101". The communication management system 5 stores the same image data ID, IP address of the sender terminal, and image type information as those stored in a communication terminal, such as the videoconference terminal 3. This enables the communication management system 5 to transmit the image type information, etc., to a communication terminal that is currently participating in video communication and another communication terminal that newly participates in the video communication by entering a virtual conference room of the video communication. Accordingly, the communication terminal that is already in the video communication and the communication terminal that is newly participates in the video communication do not have to such information including the image type information.

Image Capturing Device Direction/Position Information List Management Table:

FIG. 20 is an illustration of an example data structure of the image capturing device direction/position information list management table. The image capturing device direction/position information list management table is a table for collectively managing all information of the image capturing device direction/position information management table managed by each videoconference terminal. Furthermore, in order to associate with the session management DB 5001 and the image type management DB 5002, a session ID is also associated.

From among these information items of image capturing device direction/position information list management table, the session ID is a session ID acquired from the session management DB 5001. The image data ID is an image data ID acquired from the image type management DB 3001. The sender terminal IP address is an IP address of a transmission source (a terminal that transmits image data corresponding to the associated image data ID).

As illustrated in FIG. 28, the virtual space Top indicates the top of a region of the virtual space in which the position of the image capturing device 1 is mapped. It is sufficient that any one of the five videoconference terminals participating in a session sets a value of the virtual space Top. Even when two or more videoconference terminals set values, a process of acquiring the maximum region is performed.

The virtual space Left indicates the left of the region of the virtual space in which the position of the image capturing device 1 is mapped. It is sufficient that any one of the five participating videoconference terminals sets a value of the virtual space Left. Even when two or more videoconference terminals set values, a process of acquiring the maximum region is performed.

The virtual space Bottom indicates the bottom of the region of the virtual space in which the position of the image capturing device 1 is mapped. It is sufficient that any one of the five participating videoconference terminals sets a value of the virtual space Top. Even when two or more videoconference terminals set values, a process of acquiring the maximum region is performed.

The virtual space Right indicates the right of the region of the virtual space in which the position of the image capturing device 1 is mapped. It is sufficient that any one of the five participating videoconference terminals sets a value of the virtual space Right. Even when two or more videoconference terminals set values, a process of acquiring the maximum region is performed.

In the virtual space defined by the upper left corner position (Top, Left) and the lower right corner position (Bottom, Right), the position of the videoconference terminal 3 connected to the image capturing device 1 can be mapped, instead of the position of the image capturing device 1.

The direction $\theta$ (polar angle) indicates an imaging direction $\theta$ of the image capturing device 1 (see FIG. 6). The direction $\varphi$ (azimuth angle) indicates an imaging direction $\varphi$ of the image capturing device 1 (see FIG. 6).

The mapping position x indicates the position of an X-axis when the actual position of the image capturing device 1 in the real world is mapped to the virtual space. The mapping position y indicates the position of a Y-axis when the actual position of the image capturing device 1 in the real world is mapped to the virtual space. The mapping position z indicates the position of a Z-axis when the actual position of the image capturing device 1 in the real world is mapped to the virtual space. Hereinafter, it is assumed that the mapping position Z is always zero, and the description thereof is omitted.

In the items from the virtual space Top to the mapping position z, values are input when there is the videoconference terminal 3 and the image capturing device 1 that perform video distribution in the exhibition venue. In a case of a participant side such as the VR terminal, a special value is stored in order to identify the participant side terminal as a terminal that is not in the exhibition venue. For example, a null value can be entered as indicated in a record corresponding to a session ID "se101" and an image data ID "RS003" in a table of FIG. 20.

Each Functional Unit of Communication Management System 5:

Referring to FIG. 11 and FIG. 14A, each of the functional units of the communication management system 5 is described in detail.

The data exchange unit 51 of the communication management system 5 is mainly implemented by the network I/F 509, which operates under control of the CPU 501 illustrated in FIG. 11. The data exchange unit 51 exchanges various data or information with the videoconference terminal 3 or the PC 7 through the communication network 100.

The determination unit 55, which is mainly implemented by operation of the CPU 501, performs various determinations.

The generator 56, which is mainly implemented by instructions of the CPU 501, generates an image data ID.

The image capturing device position information/session processor 57 is mainly implemented by instructions of the CPU 501. The image capturing device position information/session processor 57 generates information of the image capturing device direction/position information list management DB 5003 from each information of the session management DB 5001 and the image type management DB 5002 and the direction/position information of the image capturing device acquired from the image capturing device direction/position management DB 3003 of the videoconference terminal 3. More specifically, the image capturing device position information/session processor 57 receives the image capturing device information that is input by the image capturing device position information input unit 37 of the videoconference terminal 3 and transmitted from the data exchange unit 31 to the data exchange unit 51 via the communication network 100, and stores the received image capturing device information together with the information of each of the session management DB 5001 and the image type management DB 5002 in the image capturing device direction/position information list management DB 5003. In the following, a description is given of an example in which the image capturing device 1 is a celestial-sphere camera.

However, a general-purpose camera or a two-dimensional panoramic camera can be used in alternative to the celestial-sphere camera.

The data storage/read unit 59 is mainly implemented by the HDD 505 illustrated in FIG. 11, which operates under control of the CPU 501. The data storage/read unit 59 stores various data or information in the memory 5000 and reads out various data or information from the memory 5000.

<Functional Configuration of PC 7>

Figure 14C:
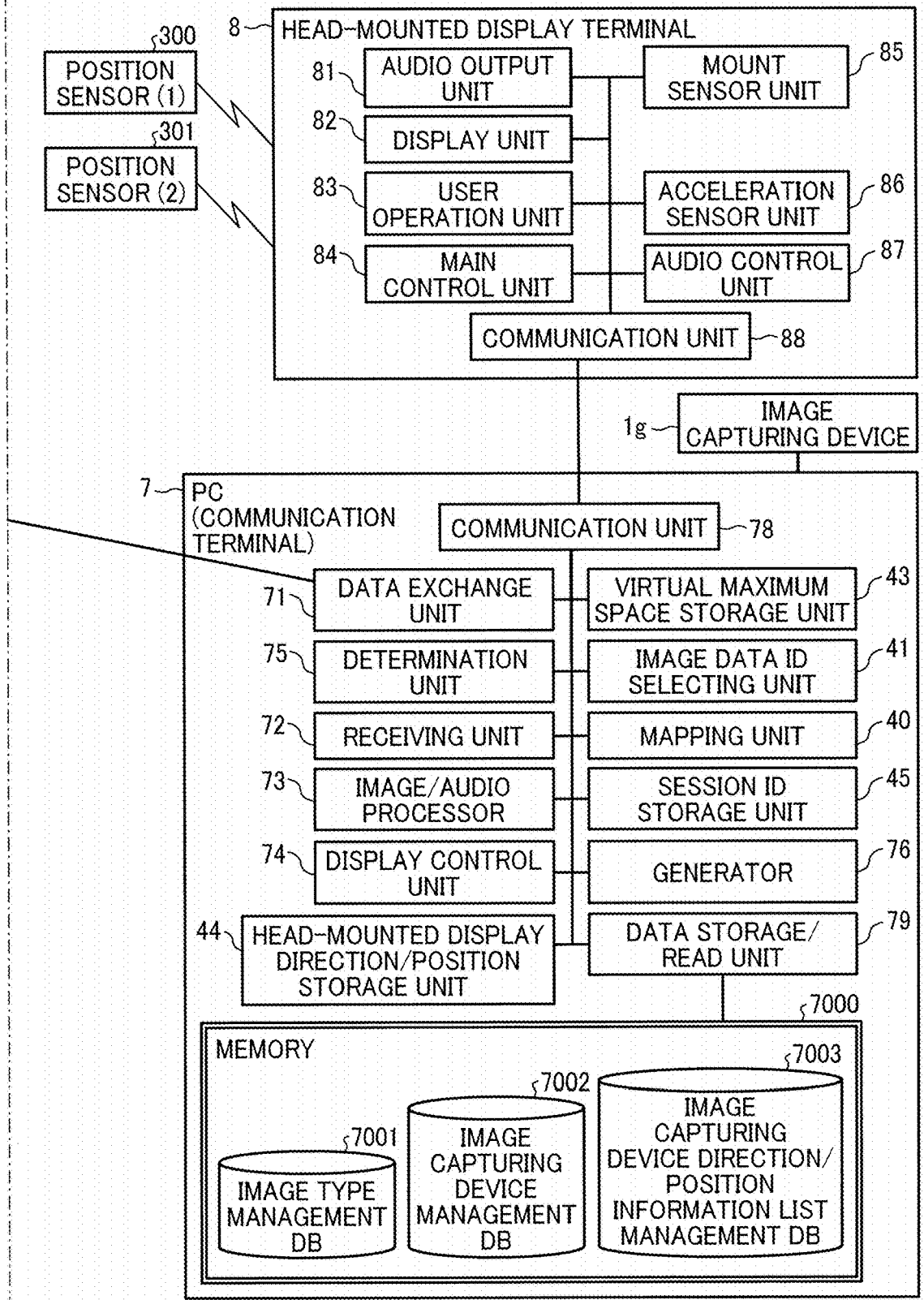

Referring to FIG. 11 and FIG. 14C, a functional configuration of the PC 7 is described according to the embodiment. The PC 7 basically has the common functions as those of the videoconference terminal 3. In other words, as illustrated in FIG. 14C, the PC 7 includes a data exchange unit 71, a receiving unit 72, an image/audio processor 73, a display control unit 74, a determination unit 75, a generator 76, a communication unit 78, and a data storage/read unit 79. These units are functions that are implemented by or that are caused to function by operating any of the constituent elements illustrated in FIG. 11 in cooperation with the instructions of the CPU 501 according to the control program for the PC 7, expanded from the HD 504 to the RAM 503.

Furthermore, the PC 7 has a mapping unit 40, an image data ID selecting unit 41, a virtual maximum space storage unit 43, a head-mounted display direction/position storage unit 44, and a session ID storage unit 45.

The PC 7 further includes a memory 7000, which is implemented by the ROM 502, the RAM 503 and the HD 504 illustrated in FIG. 11. The memory 7000 includes an image type management DB 7001, an image capturing device management DB 7002, and an image capturing device direction/position information list management DB 7003. The image type management DB 7001, the image capturing device management DB 7002, and the image capturing device direction/position information list management DB 7003 have the same or substantially the same data structure as the image type management DB 3001, the image capturing device management DB 3002, and the image capturing device direction/position information list management DB 5003, respectively, and redundant descriptions thereof are omitted below.

Each functional Unit of PC 7:

The data exchange unit 71 of the PC 7 is mainly implemented by the network I/F 509, which operates under control of the CPU 501 illustrated in FIG. 11. The data exchange unit 71 implements the similar or substantially the similar function to that of the data exchange unit 31.

The receiving unit 72 is mainly implemented by the keyboard 511 and the mouse 512, each of which operates under control of the CPU 501. The receiving unit 72 implements the similar or substantially the similar function to that of the receiving unit 32.

The image/audio processor 73, which is mainly implemented by instructions of the CPU 501, implements the similar or substantially the similar function to that of the image/audio processor 33.

The display control unit 74, which is mainly implemented by instructions of the CPU 501, implements the similar or substantially the similar function to that of the display control unit 34.

The determination unit 75, which is mainly implemented by instructions of the CPU 501, implements the similar or substantially the similar function to that of the determination unit 35.

The generator 76, which is mainly implemented by instructions of the CPU 501, implements the similar or substantially the similar function to that of the generator 36.

The communication unit 78, which is mainly implemented by instructions of the CPU 501, implements the similar or substantially the similar function to that of the communication unit 38.

The data storage/read unit 79, which is mainly implemented by instructions of the CPU 501, stores various data or information in the memory 7000 and reads out various data or information from the memory 7000.

The mapping unit 40, which is implement by instructions of the CPU 501, processes mapping information described later (see the flowchart of FIG. 30).

Figure 31:
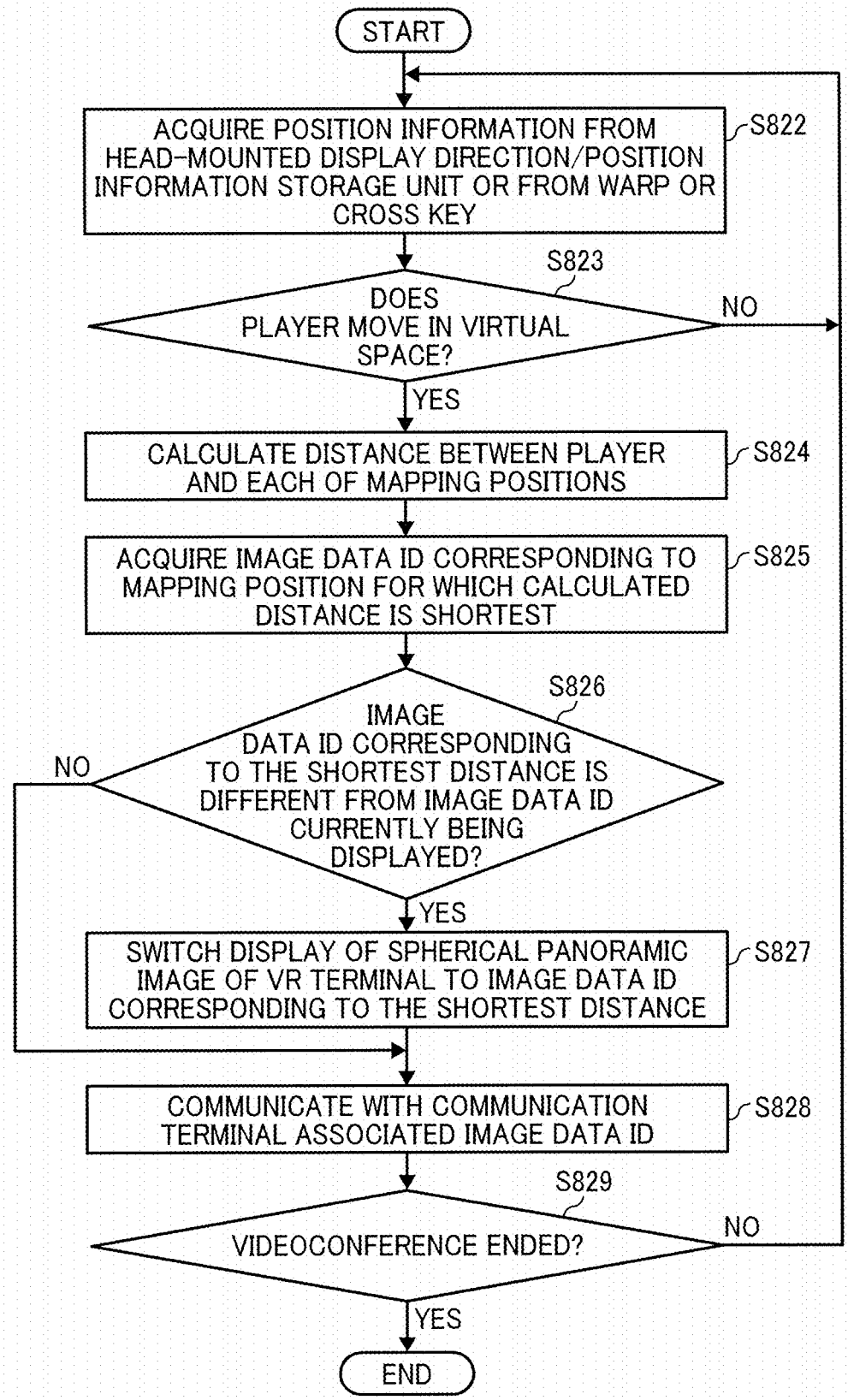
FIG. 31 is a flowchart illustrating an operation performed by an image data ID selecting unit, according to an embodiment of the present disclosure.

The image data ID selecting unit 41, which is implemented by instructions of the CPU 501, causes the head-mounted display terminal 8 to display an image based on the position information (see the flowchart of FIG. 31).

The virtual maximum space storage unit 43 is implemented by the ROM 809 and the RAM 810. The virtual maximum space storage unit 43 stores virtual maximum space information indicating a value calculated by the mapping unit 40. Specifically, the virtual maximum space storage unit 43 stores values that implements the largest virtual space from among values of the Top, Left, Bottom, and Right of the virtual space input by the videoconference terminals 3a to 3e.

FIG. 21 is an illustration of an example of data structure of the virtual maximum space information stored in the virtual maximum space storage unit 43. From among the virtual maximum space information illustrated in FIG. 21, the "virtual maximum space Top" indicates the top of the virtual space in which the position of the image capturing device 1 is to be mapped. The "virtual maximum space Left" indicates the left of the virtual space in which the position of the image capturing device 1 is to be mapped. The "virtual maximum space Bottom" indicates the bottom of the virtual space in which the position of the image capturing device 1 is to be mapped. The "virtual maximum space Right" indicates the right of the virtual space in which the position of the image capturing device 1 is to be mapped.

The "scale X" indicates the ratio (times) of the virtual space (see FIG. 28) to the real space (see FIG. 29) for the X-axis of the play area. The "scale X" indicates the ratio (times) of the virtual space (see FIG. 28) to the real space (see FIG. 29) for the Y-axis of the play area. The ratio of the Y-axis of the virtual space to the Y-axis of the play area is stored. The "scale Z" indicates the ratio (times) of the virtual space (see FIG. 28) to the real space (see FIG. 29) for the Z-axis of the play area. Hereinafter, it is assumed that the scale Z is always zero, and the description thereof is omitted.

The head-mounted display direction/position storage unit 44 is implemented by the ROM 809 and the RAM 810. The head-mounted display direction/position storage unit 44 stores position information of room scale as illustrated in FIG. 22, in a case where room scale is used in the VR system. In a case where other means than room scale is used, an empty value is stored.

FIG. 22 is an illustration of an example of data structure of head-mounted display information stored in the head-mounted display direction/position storage unit 44. Region information that is used by the image data ID selecting unit 41 illustrated in FIG. 14C and is used for mapping is stored.

From among the head-mounted display information illustrated in FIG. 22, the "direction θ (polar angle)" indicates the direction θ of the head-mounted display terminal 8 (see FIG. 6 and FIG. 30). The "direction φ (azimuth angle)" is the direction φ of the head-mounted display terminal 8 (see FIG. 6 and FIG. 30). The "position X" indicates the position of the X-axis of the head-mounted display terminal 8 in room scale of the meeting room in the real space. The "position Y" indicates the position of the Y-axis of the head-mounted display terminal 8 in room scale of the meeting room in the real space. The "position Z" indicates the position of the Z-axis of the head-mounted display terminal 8 in room scale of the meeting room in the real space. Hereinafter, it is assumed that the position of the Z-axis is always zero, and the description thereof is omitted.

The session ID storage unit 45 is implemented by the ROM 809 and the RAM 810. The session ID storage unit 45 stores the session ID selected in a process of participating in a specific communication session.

<Functional Configuration of Head-Mounted Display Terminal 8>

Next, referring to FIG. 13 and FIG. 14C, a functional configuration of the head-mounted display terminal 8 is described. The head-mounted display terminal 8 includes an audio output unit 81, a display unit 82, a user operation unit 83, a main control unit 84, a mount sensor unit 85, an acceleration sensor unit 86, an audio control unit 87, and a communication unit 88. These units are functions that are implemented by or that are caused to function by operating any of the constituent elements illustrated in FIG. 13 in cooperation with the instructions of the CPU 806 according to the control program for the head-mounted display terminal 8, expanded from the ROM 805 to the VRAM 803 or from the ROM 809 to the RAM 810.

Each Functional Unit of Head-Mounted Display Terminal 8. The audio output unit 81 is mainly implemented by the right speaker 812R and the left speaker 812L, each of which operates under control of the CPU 806. The audio output unit 81 transmits audio to a person (participant) who is wearing the head-mounted display terminal 8. The display unit 82 is mainly implemented by the right display unit 808R and the left display unit 808L, each of which operates under control of the CPU 806. The display unit 82 displays the selected image. The main control unit 84, which is mainly implemented by instructions of the CPU 806, performs a process required for processing the head-mounted display terminal 8.

The mount sensor unit 85 is mainly implemented by the mount sensor 821, which operates under control of the CPU 806. The mount sensor unit 85 performs a process of checking whether the participant is wearing the head-mounted display terminal 8. The acceleration sensor unit 86 is mainly implemented by the acceleration sensor 822, which operates under control of the CPU 806. The acceleration sensor unit 86 performs a process of detecting movement of the head-mounted display terminal 8.

The audio control unit 87 is mainly implemented by the audio DAC 811, which operates under control of the CPU 806. The audio control unit 87 controls audio output from the head-mounted display terminal 8.

The communication unit 88 is mainly implemented by the signal transmitter/receiver 801, which operates under control of the CPU 806. The communication unit 88 has the same function as that of the communication unit 78 to communicate with the communication unit 78.

Operation or Processes of Embodiment:

Referring to FIG. 23 to FIG. 36, a description is given of an operation or processes according to the present embodiment.

<Process of Participation>

Figure 23:
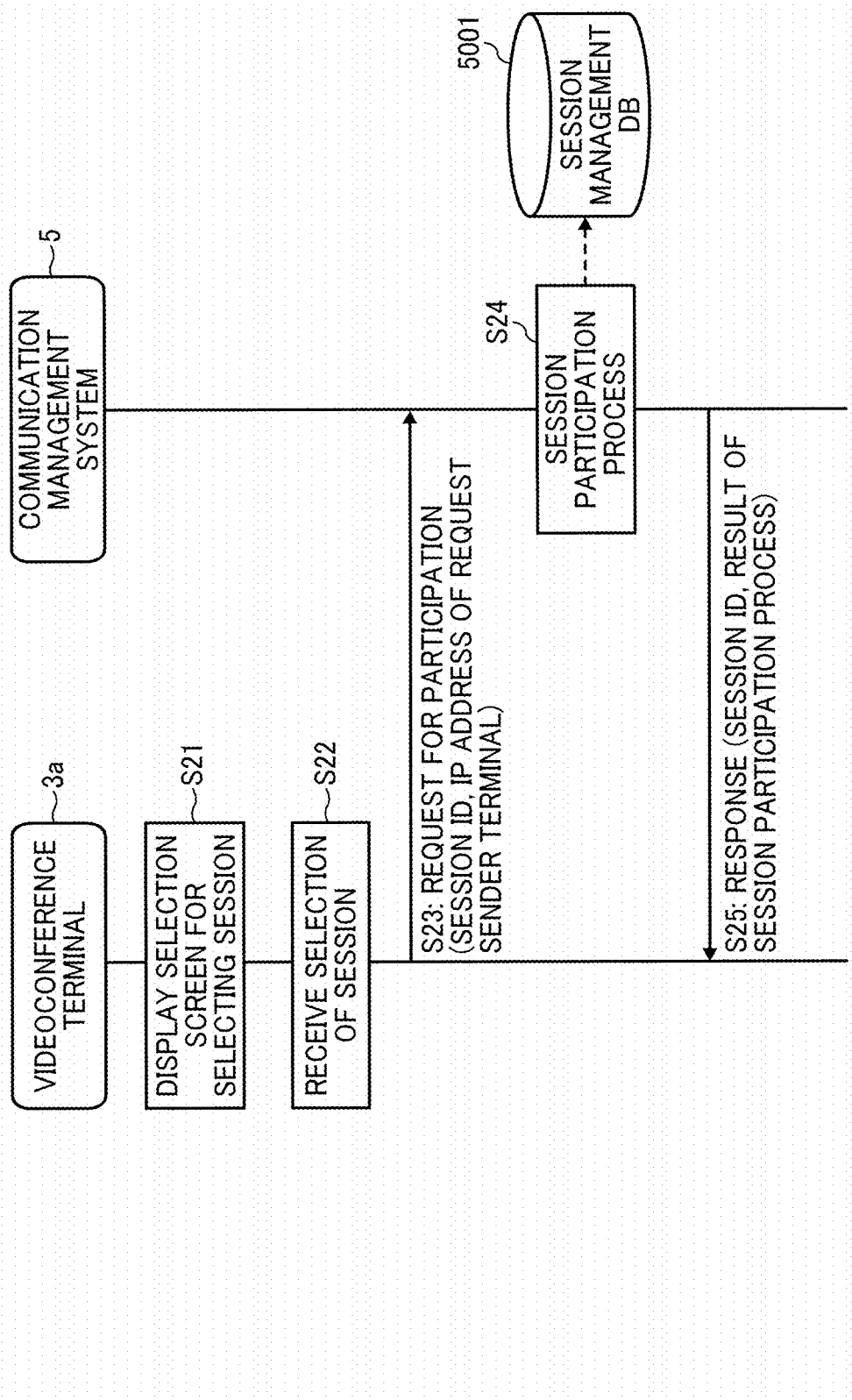
FIG. 23 is a sequence diagram illustrating an operation of participating in a specific communication session, according to an embodiment of the present disclosure.

First, referring to FIG. 23 and FIG. 24, an operation of participating in a specific communication session is described, according to the embodiment. FIG. 23 is a sequence diagram illustrating an operation of participating a specific communication session, according to the embodiment. FIG. 24 is an illustration of a session selection screen for selecting a communication session (virtual conference room), according to the embodiment.

When a user in the Booth Ba (e.g., the commentator Ca) operates the videoconference terminal 3a to display the session selection screen for selecting a communication session (virtual conference room), the receiving unit 32a receives the operation to display the session selection screen, and the display control unit 34a causes the display 4a to display the session selection screen as illustrated in FIG. 24 (step S21). In the session selection screen, selection buttons b1, b2, and b3 are displayed, for example. The selection buttons b1, b2, and b3 respectively indicates the exhibition venue 501, the exhibition venue 502, and a virtual conference room R3, each of which is a selection target. Each of the selection buttons b1, b2, and b3 is associated with a corresponding session ID.

When the commentator Ca selects a desired selection button (in this example, the selection button b2) on the session selection screen, the receiving unit 32a receives selection of a corresponding communication session (step S22). Then, the data exchange unit 31a transmits a request to participate in the communication session, namely to enter the exhibition venue 501, to the communication management system 5 (step S23). This participation request includes a session ID identifying the communication session for which the selection is received at step S22, and the IP address of the videoconference terminal 3a, which is a request sender terminal. The communication management system 5 receives the participation request at the data exchange unit 51.

Next, the data storage/read unit 59 performs a process for causing the videoconference terminal 3a to participate in the communication session (step S24). More specifically, the data storage/read unit 59 adds, in the session management DB 5001 (FIG. 18), the IP address that is received at step S23 to a field of the participant terminal IP address in a record of the session ID that is the same as the session ID received at step S23. The data exchange unit 51 transmits a response to the participation request to the videoconference terminal 3a (step S25). This response to the participation request includes the session ID that is received in step S23, and a result of the participation process. The videoconference terminal 3a receives the response to the participation request at the data exchange unit 31a.

FIG. 24 is an illustration of the session selection screen for selecting a communication session (virtual conference room), according to the embodiment. On the selection screen for selecting a communication session, an exhibition venue of the VR is selected. The selection screen can further include an icon (selection button) for selecting a usual videoconference. Each of the selection button b1 and the selection button b2 is a button to be pressed to communicate with other videoconference terminals located in the exhibition venue. In response to pressing of the selection button b1 and the selection button b2, communication sessions indicated by the session ID "se101" and the session ID "se102" respectively are established. In addition, the selection button b3 is a button be pressed when a usual video communication is to be performed without performing a mapping process using the virtual space. In response to pressing of the selection button b3, a communication session indicated by the session ID "se 103" is established. Thus, one of the mapping process using the virtual space and the process of the normal video communication is selected on a single screen.

The following describes a case where the participation process is successfully completed.

<Operation of Managing Image Type Information>

Figure 25:
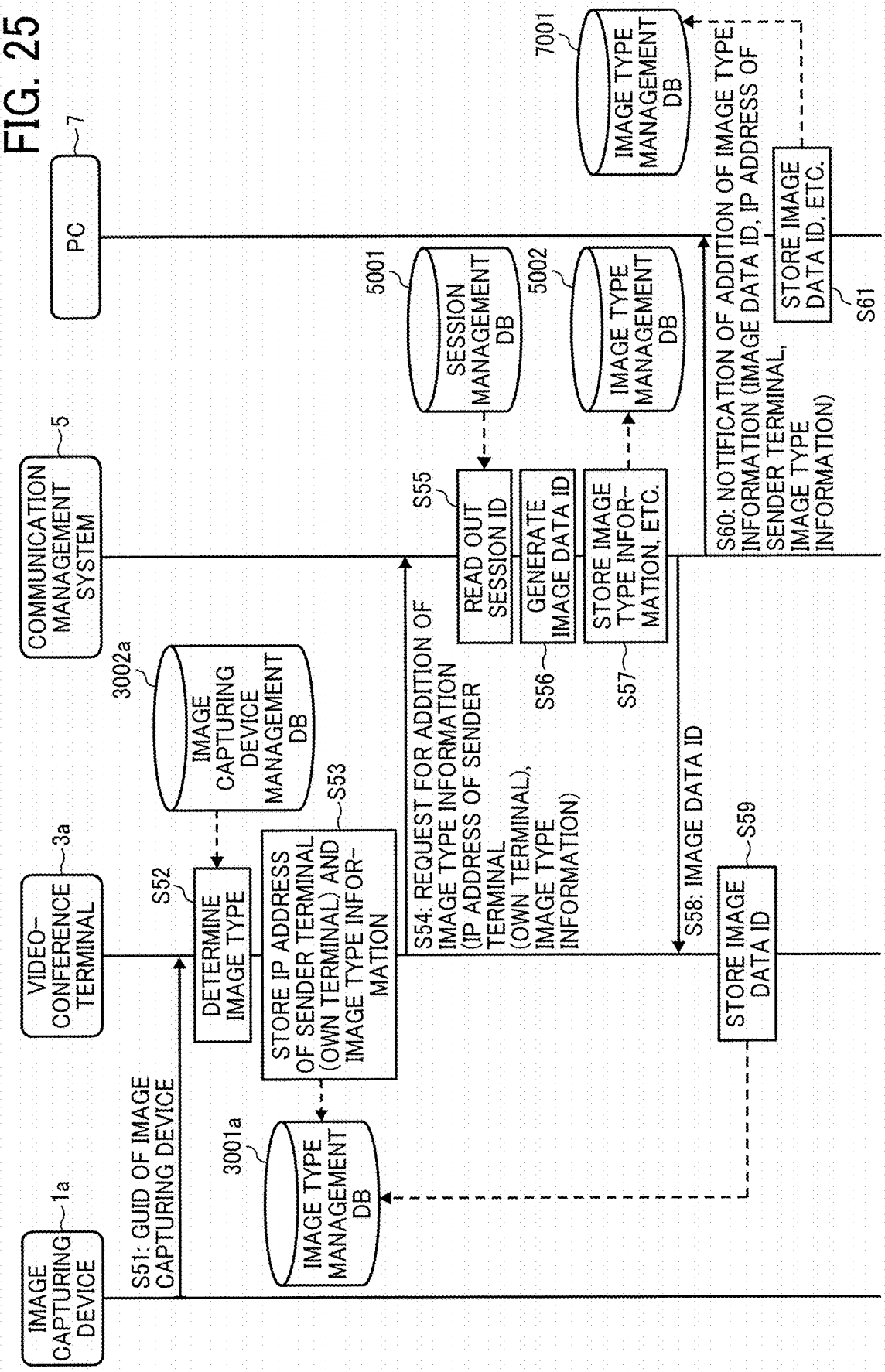
FIG. 25 is a sequence diagram illustrating an operation of managing image type information, according to an embodiment of the present disclosure.

Next, referring to FIG. 25, an operation of managing the image type information is described, according to the embodiment. FIG. 25 is a sequence diagram illustrating an operation of managing the image type information, according to the embodiment.

When the commentator Ca in the booth Ba connects the cradle 2a, on which the image capturing device 1a is mounted, to the videoconference terminal 3a, using a wired cable such as a USB cable, the data storage/read unit 19 of the image capturing device 1a reads out the GUID of the own device (e.g., the image capturing device 1a) from the memory 1000. Then, the communication unit 18 transmits the own device's GUID to the communication unit 38 of the videoconference terminal 3a (step S51). The videoconference terminal 3a receives the GUID of the image capturing device 1a at the communication unit 38.

Subsequently, the determination unit 35 of the videoconference terminal 3a determines whether a vendor ID and a product ID same as the GUID received in step S51 are stored in the image capturing device management DB 3002 (see FIG. 16) to determine the image type (step S52). More specifically, the determination unit 35 determines that the image capturing device 1a is an image capturing device that captures a special image (a spherical panoramic image, in the embodiment), based on determination that the same vender ID and product ID are stored in the image capturing device management DB 3002. By contrast, the determination unit 35 determines that the image capturing device 1a is an image capturing device that captures a general image, based on determination that the same vender ID and product ID are not stored in the image capturing device management DB 3002.

Next, the data storage/read unit 39 stores, in the image type management DB 3001 (FIG. 15), the IP address of the own terminal (i.e., videoconference terminal 3a), which is a sender terminal, in association with the image type information, which is a determination result determined in step S52 (step S53). In this state, any image data ID is not yet associated. Examples of the image type information include a source name, which is determined according to the naming rule, and an image type (general image or special image).

Then, the data exchange unit 31 transmits a request for addition of the image type information to the communication management system 5 (step S54). This request for addition of image type information includes the IP address of the own terminal (videoconference terminal 3a) as a sender terminal, and the image type information, both being stored in step S53 in association with each other. The communication management system 5 receives the request for addition of the image type information at the data exchange unit 51.

Next, the data storage/read unit 59 of the communication management system 5 searches the session management DB 5001 (FIG. 18) using the IP address of the sender terminal received in step S54 as a search key, to read out the session ID associated with the IP address (step S55).

Next, the generator 56 generates a unique image data ID (step S56). Then, the data storage/read unit 59 adds, in the image type management DB 5002 (FIG. 19), a new record associating the session ID that is read out in step S55, the image data ID generated in step S56, the IP address of the sender terminal and the image type information that are received in step S54, with one another (step S57). The data exchange unit 51 transmits the image data ID generated in step S56 to the videoconference terminal 3a. The videoconference terminal 3a receives the image data ID at the data exchange unit 31 (step S58).

Next, the data storage/read unit 39 of the videoconference terminal 3a stores, in the image type management DB 3001 (FIG. 15), the image data ID received in step S58, in association with the IP address of the own terminal (i.e., videoconference terminal 3a) as the sender terminal and the image type information that are stored in step S53 (step S59).

Further, the data exchange unit 51 of the communication management system 5 transmits a notification indicating addition of the image type information to the PC 7, which is another communication terminal (step S60). This notification indicating addition of the image type information includes the image data ID generated in step S56, and the IP address of the own terminal (i.e., videoconference terminal 3a) as the sender terminal and the image type information that are stored in step S53. The PC 7 receives the notification indicating addition of the image type information at the data exchange unit 71. The destination of the notification transmitted by the data exchange unit 51 is indicated by an IP address associated with the session ID with which the IP address of the videoconference terminal 3a is associated in the session management DB 5001 (FIG. 18). In other words, the destination includes other communication terminal(s) that is (are) in the same virtual conference room where the videoconference terminal 3a is participating.

Next, the data storage/read unit 79 of the PC 7 adds, in the image type management DB 7001 (FIG. 15), a new record associating the image data ID, the IP address of the sender terminal, and the image type information, which are received in step S60 (step S61). In substantially the same manner, the notification indicating addition of the image type information is transmitted to the videoconference terminal 3b to 3f and the PC 7, each of which is one of the other communication terminals, and then the videoconference terminal 3 and the PC 7 stores the image type information, etc. in the image type management DB 3001 and the image type management DB 7001. As described above, each communication terminal can share the same information in each of the image type management DB 3001, the image type management DB 5002 and the image type management DB 7001.

<Sequence Diagram Illustrating Operation of Managing Image Capturing Device Direction/Position Information>

Figure 26:
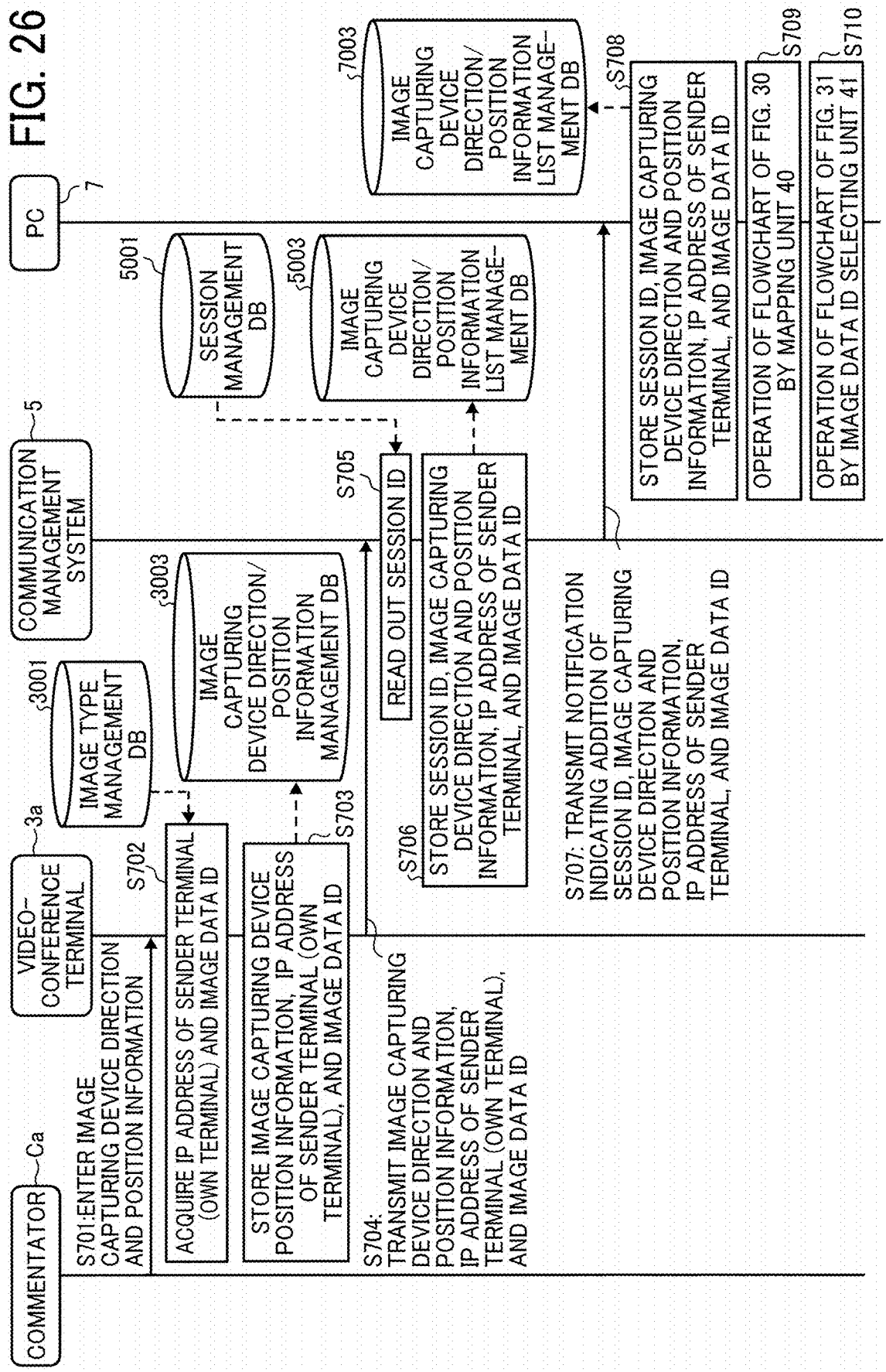
FIG. 26 is a sequence diagram illustrating an operation of managing image capturing device direction/position information, according to an embodiment of the present disclosure.

FIG. 26 is a sequence diagram illustrating an operation of managing the image capturing device direction/position information. The constructor Ea enters the direction and position information of the image capturing device 1 to the videoconference terminal 3. Thereafter, the communication management system 5 automatically generates a list based on information transmitted from the videoconference terminal 3 and transmits the list to the PC 7. In the process, the image data ID for identifying video (image) of the image capturing device and a session ID for identifying a videoconference (video communication) in which the videoconference terminal 3 is participating.

A description is given hereinafter of processes in the operation in order.

The commentator Ca enters information of the virtual space, the directions, and the mapping positions to be stored in the image capturing device direction/position management DB 3003 in the videoconference terminal 3. The receiving unit 32 receives the input of the information of the virtual space, the directions, and the mapping positions (step S701). More specifically, the commentator enters the information in the columns of the "virtual space Top", "virtual space Left", "virtual space Bottom", "virtual space Right", "direction θ (polar angle)", "direction φ (azimuth angle)", "mapping position X", "mapping position Y", and "(mapping position Z)". In the following, it is assumed that the mapping position Z is always zero, and the description thereof omitted to simplify the description.

Next, the data storage/read unit 39 acquires the image data ID from the image type management DB 3001 (step S702). The data storage/read unit 39 stores the image data ID acquired in step S702 and the information of the virtual space, the directions, and the mapping positions received in step S701 as the image capturing device information in the image capturing device direction/position management DB 3003 (step S703).

Next, the data exchange unit 31 transmits, to the data exchange unit 51 of the communication management system 5, the image capturing device information of the image capturing device direction/position management DB 3003, the IP address of the videoconference terminal 3a (own terminal) as a sender terminal, and the image data ID (step S704).

Next, the data storage/read unit 59 of the communication management system 5 reads out the session ID from the session management DB 5001 (step S705). Then, the data storage/read unit 59 stores the session ID that is read out in step S705 in association with the information received in step S704 in the image capturing device in the image capturing device direction/position information list management DB 5003 (step S706). The data exchange unit 51 transmits the information of the image capturing device direction/position information list management DB 5003 to the data exchange unit 71 of the PC 7 (step S707). In this step, only the information corresponding to the session ID in which the PC 7 is participating can be transmitted to the PC 7.

Next, the data storage/read unit 79 of the PC 7 stores each of the information received in step S707 in the image capturing device direction/position information list management DB 7003 (step S708).

<Mapping Process>

Next, a description is given of an operation (mapping process) of mapping the image capturing device 1 (or the videoconference terminal 3) in the real space (real world) to the virtual space (virtual world).

Before describing the mapping process, regions of the real world and the virtual world are described with reference to FIG. 27 to FIG. 29.

Figure 27:
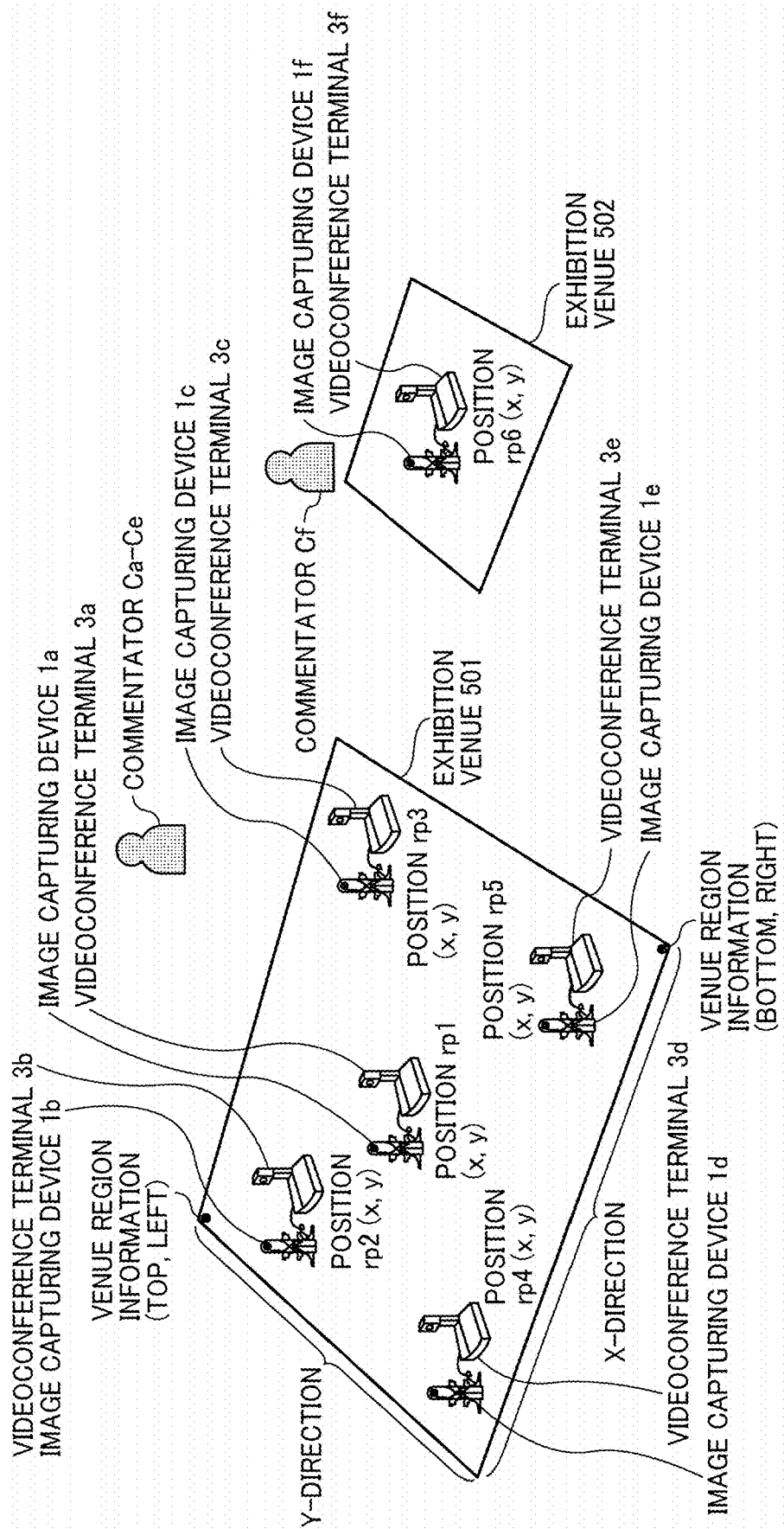
FIG. 27 is a diagram illustrating a position of the videoconference terminal (image capturing device) in an exhibition venue in the real space, according to an embodiment of the present disclosure.

Relative Positions in Real Space:

FIG. 27 is a diagram illustrating the position of the videoconference terminal 3 (image capturing device 1) in the exhibition venue in the real space. In an example illustrated in FIG. 27, five videoconference terminals 3a to 3e are located in the exhibition venue 501, and one videoconference terminal 3f is located in the exhibition venue 502.

The image capturing device 1a to 1e are connected to the videoconference terminals 3a to 3e, respectively. Positions rp1 to rp5 represent positions of the image capturing devices 1a to 1e, respectively.

The positions and venue information (Top, Left, Bottom, Right) are physical positions. In the embodiment, the unit is meter (m). The constructor Ea or the constructor Eb enters the mapping information of FIG. 34 of the image capturing device direction/position information with reference to these physical positions.

Hereinafter, an "image data ID of an image captured by the image capturing device connected to the videoconference terminal 3" is referred to as an "image data ID of the videoconference terminal 3". Further, "selecting an image data ID of a videoconference terminal" is equivalent to selecting the videoconference terminal 3 as a communication target, since the videoconference terminal is specified when the image data ID is specified.

Relative Positions in Virtual Space:

FIG. 28 is a diagram illustrating the position of the videoconference terminal 3 (image capturing device 1) in the exhibition venue in the virtual space. FIG. 28 illustrates an example in which the image capturing device direction/position information is mapped in the virtual space with reference to the physical position of the exhibition venue and the installation position of the videoconference terminal 3 (image capturing device 1). The positions rp1 to rp5 in FIG. 27 are mapped to mapping positions vp1 to vp5 in FIG. 28, respectively. In this example, mapping is performed in the virtual space on the assumption that one meter is one unit. The constructor Ea enters the mapping positions using the videoconference terminal 3a to 3e. In another example, the commentators Ca to Ce can enter the mapping positions.

The mapping positions do not necessarily have to coincide with the physical positions. For example, FIG. 33B illustrates an example in which the mapping positions are arranged in the Y-axis direction.

First, the participant Ac is located as a player Pb in the virtual space. A position to which the player Pb moves is indicated by a position (x, y).

Virtual space region information indicates a region of a virtual space that is set with reference to exhibition venue area information. The virtual space region information is input from each of the videoconference terminals. It is sufficient that one piece of virtual space region information is input. In a case where a plurality of pieces of virtual space region information are input, values that define maximum region are calculated based on the image capturing device direction/position information list management DB 7003 by an operation performed by the mapping unit 40 as illustrated in the flowchart of FIG. 30. The virtual space region information is used to calculate the scale when room scale is used as means for moving in the virtual space.

Figure 29:
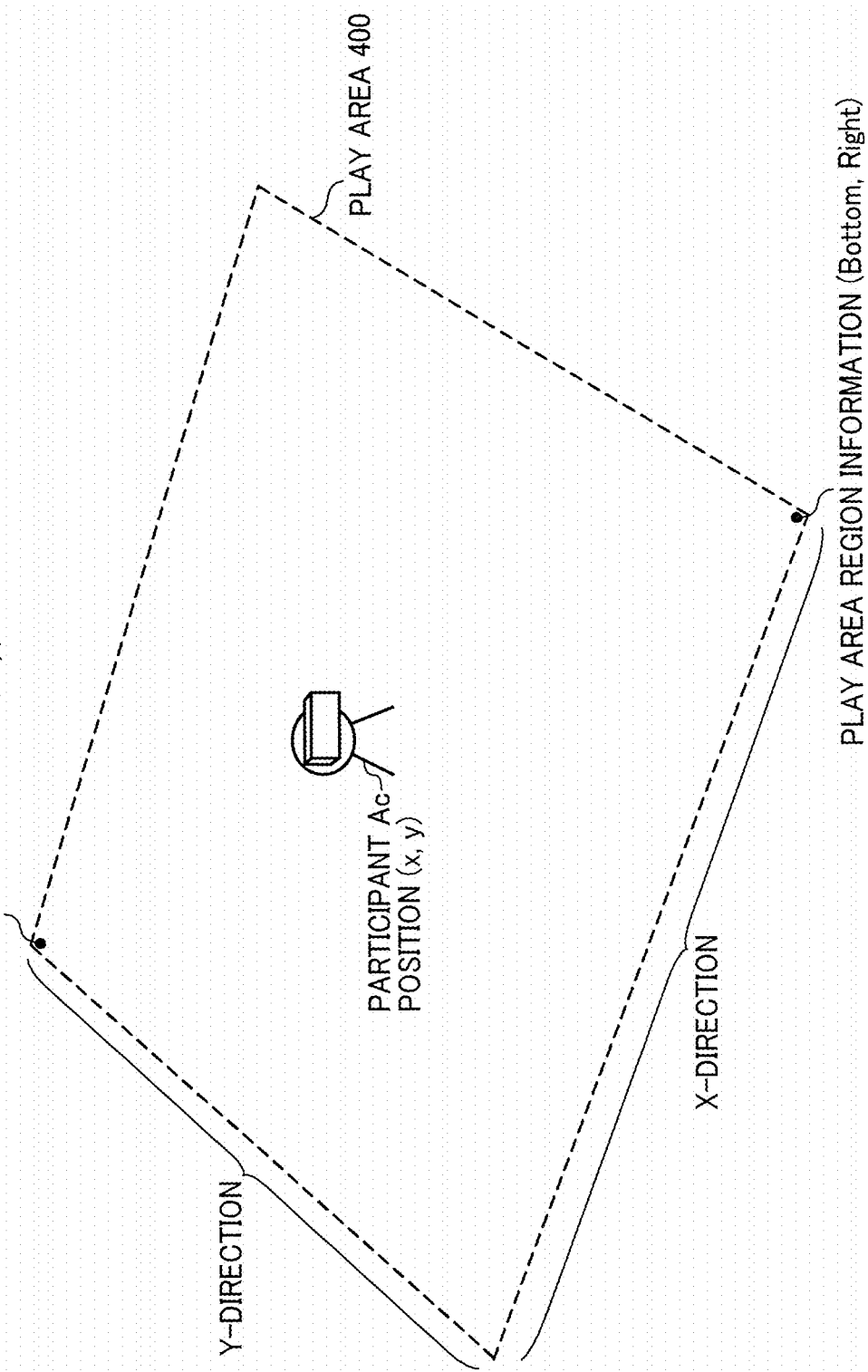
FIG. 29 is a diagram illustrating room scale of a meeting room in the real space, according to an embodiment of the present disclosure.

Room Scale:

FIG. 29 is a diagram illustrating room scale of the meeting room in the real space. FIG. 29 illustrates an example of "room scale", which is one of means for moving in the virtual space to which the exhibition venue is mapped. The participant Ac moves in the play area 400 of room scale whose size is 2 square meters to cause the player Pb to move in the virtual space.

The ratio of the unit of the virtual space and the play area 400 is calculated by the operation performed by the mapping unit 40 as illustrated in the flowchart FIG. 30. In the embodiment, since 200 units correspond to 2 meters, the ratio is 100. When the participant Ac moves to the right by 0.01 meter, the player Pb in the virtual space moves to the right by 1 meter in the virtual space.

After the participant Ac moves in the play area 400, the image data ID selecting unit 41 acquires the image data ID of the position information of the image capturing device 1 whose mapping position is closest to the player Pb and causes the VR terminal to display an image represented by the acquired image data ID as described below with reference to the flowchart of FIG. 31.

Operation by Mapping Unit 40:

FIG. 30 is a flowchart illustrating an operation performed by the mapping unit 40.

S801: The operation by the mapping unit 40 starts.

S802: The mapping unit 40 acquires the session ID of the own terminal as the VR terminal from the session ID storage unit 45.

S803: The mapping unit 40 acquires information of the image capturing device direction and position information list associated with the same session ID as the own terminal from the image capturing device direction/position information list management DB 7003. The information of the image capturing device direction/position information list management DB 5003 has already been transmitted to the PC 7 of the VR terminal in step S707 of FIG. 26.

S804: The mapping unit 40 generates the image capturing device direction/position information list excluding "null value" indicating the VR terminal (see FIG. 20).

S805: The mapping unit 40 acquires the values of the virtual space Top, Left, Bottom and Right from the image capturing device direction/position information list generated in step S804, to determine the value of Top, Left, Bottom, and Right according to which the region is largest. Specifically, the mapping unit 40 retrieves the smallest values of the Top and Left and the largest values of the Bottom and Right.

S806: The mapping unit 40 stores the values acquired in step S805 the virtual maximum space storage unit 43.

S807: The mapping unit determines whether room scale is used as means for moving in the virtual space. Specifically, the mapping unit determines that room scale is used based on determination that any value is stored in the head-mounted display direction/position storage unit 44. In a case room scale is not used, the information of the scale in not required. Accordingly, the operation ends.

S808: The mapping unit 40 calculates the scale based on the values of virtual space region information (Top, Left, Bottom, Right) and play area region information (Top, Left, Bottom, Right). Specifically, the mapping unit 40 performs the calculation in step S808 by the following equations 1 and 2.

Scale $X$=(Virtual space region information Right−Virtual space region information Left)/(Play area region information Right−Play area region information Left)  (1)

Scale $Y$=(Virtual space region information Bottom−Virtual space area information Top)/(Play area region information Bottom−Play area region information Top)  (2)

S809: The information of scale X and scale Y calculated in S808 is stored in the virtual maximum space storage unit 43.

S810: The mapping unit 40 maps the image capturing device direction/position information list in the virtual space.

S811: The operation ends.

Figure 35:
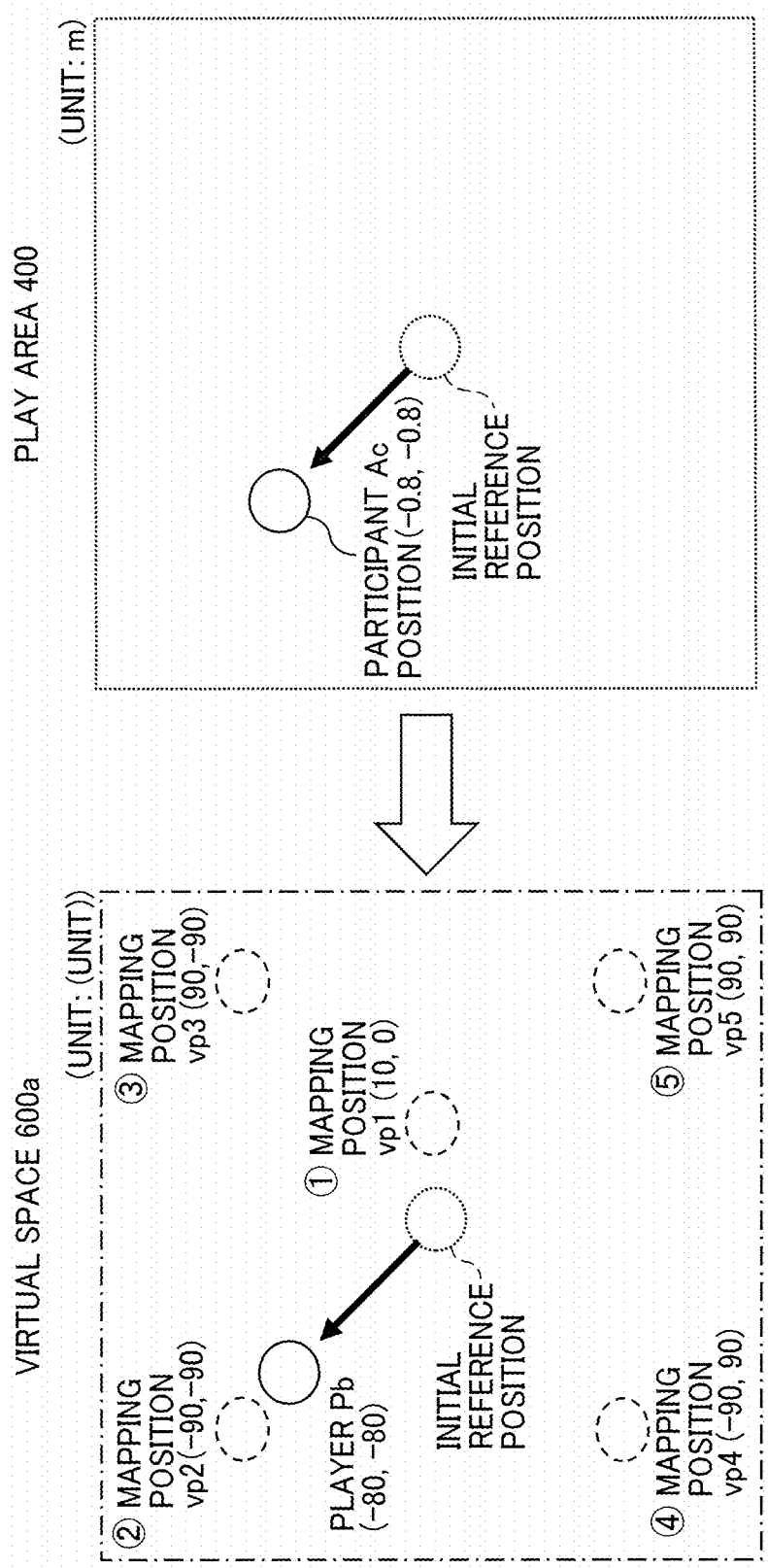
FIG. 35 is an illustration for describing an example of movement in the virtual space and how an image to be displayed is automatically selected from images generated by the videoconference terminal and the image capturing device, according to an embodiment of the present disclosure.

Operation by Image Data ID Selecting Unit 41:

FIG. 31 is a flowchart illustrating an operation performed by the image data ID selecting unit 41. FIG. 35 is an illustration for describing the operation by the image data ID selecting unit 41.

S821: The operation by the image data ID selecting unit 41 starts.

S822: The image data ID selecting unit 41 acquires the position in the virtual space from head-mounted display direction/position storage unit 44 based on the position of the play area. In another example, a warp or a cross key can be used for moving in the virtual space and acquiring the position information.

S823: The image data ID selecting unit 41 determines whether the player Pb has moved in the virtual space. When the image data ID selecting unit 41 determines that the player Pb has moved, the operation proceeds to step S824. By contrast, when the image data ID selecting unit 41 determines that the player Pb has not moved, the operation returns to step S822.

S824: The image data ID selecting unit 41 calculates the distance between the position of the player Pb and each of the mapping position of the videoconference terminals in the virtual space. Specifically, the image data ID selecting unit 41 calculates the distance by the following equation 3.

$$\sqrt{((x-x2)^2+(y1-y2)^2)} \quad (3)$$

S825: The image data ID selecting unit 41 identifies the mapping position corresponding to the shortest distance from among the distances calculated in step S824. Since the image data ID is included in the information of the mapping position, the image data ID selecting unit 41 acquires the image data ID of the mapping position corresponding to the shortest distance.

S826: The image data ID selecting unit 41 compares the image data ID of an image currently being displayed with the image data acquired in step S825, to determine the two image data IDs are different from each other. When the image data ID selecting unit 41 determines that the two image data IDs are different from each other, the operation proceeds to step S827. By contrast, when the image data ID selecting unit 41 determines that the two image data IDs are the same, the operation proceeds to step S828.

S827: The image data ID selecting unit 41 causes the VR terminal to display an image represented by the image data ID corresponding to the shortest distance.

S828: The VR terminal communicates with the videoconference terminal 3 of the image data ID. When the image data ID is specified, the videoconference terminal 3 that is the transmission source of an image identified by the image data ID can be identified. Accordingly, the participant Ac can communicate with the commentator near the identified videoconference terminal 3. Specifically, the image data ID selecting unit 41 acquires the sender terminal IP address in the record corresponding to the image data ID from the image capturing device direction/position information list management DB 7003, to identify the videoconference terminal. The videoconference terminal 3 and the VR terminal starts communication. Although the image capturing device 1 alone can only transmit video, the videoconference terminal 3 includes the microphone 314, the speaker 315, and the camera 312. Accordingly, the VR terminal can perform communication by audio and video.

S829: The image data ID selecting unit 41 determines whether to end the video conference. When the image data ID selecting unit 41 determines that the video conference is not to be ended, the operation returns to the acquisition of the position at step S822. When the image data ID selecting unit 41 determines that the video conference is to be ended, the operation ends (step S830).

Figure 32A:
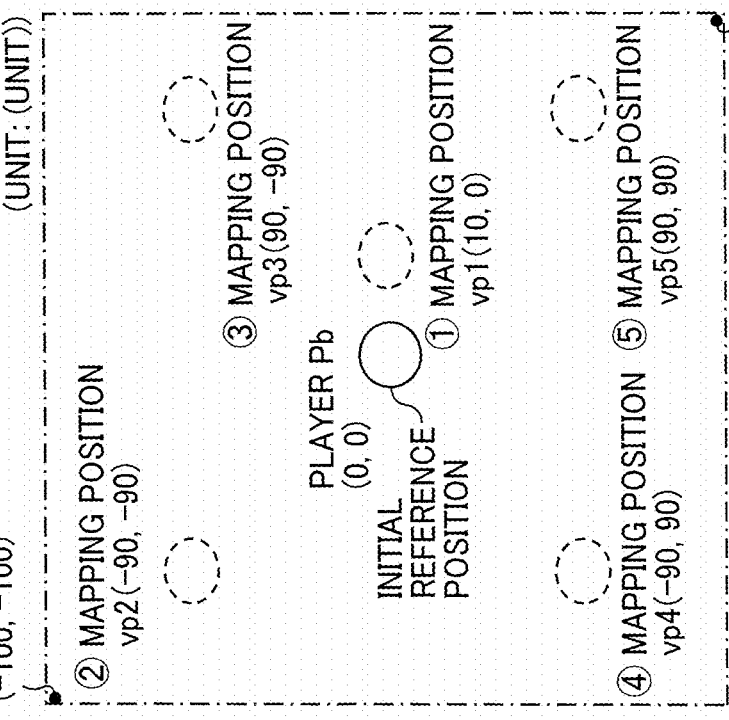
FIG. 32A and FIG. 32B are an illustration for describing an example of how a position in the exhibition venue is mapped to the virtual space, according to an embodiment of the present disclosure.
Figure 32B:
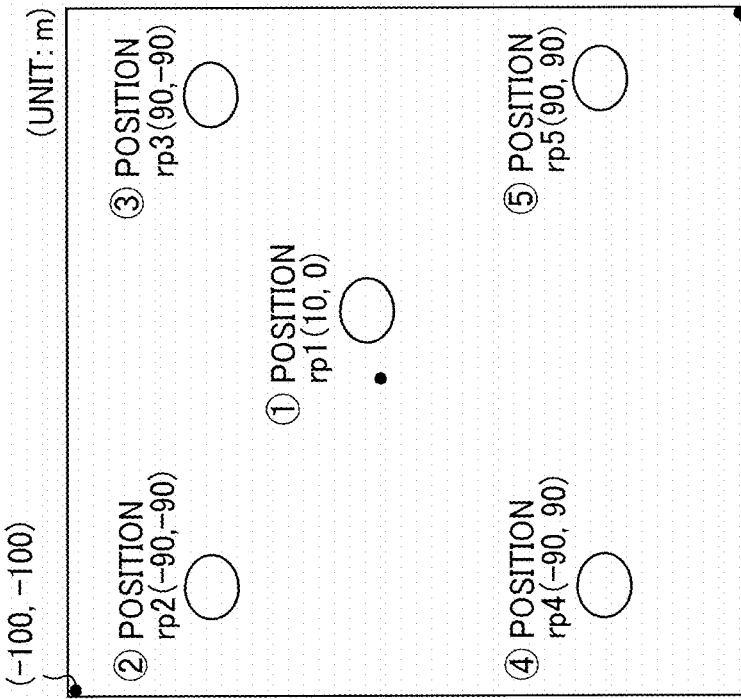

Illustration for Describing How Position in Exhibition Venue is Mapped to Virtual Space:

FIGS. 32A and 32B are an illustration for describing an example of how the position in the exhibition venue is mapped to the virtual space. FIGS. 32A and 32B illustrate an example in which the positions rp1 to rp5 in the exhibition venue 500 in the real space are mapped to the mapping positions vp1 to vp5 in the virtual space 600. In FIGS. 32A and 32B, the positions rp1 to rp5 correspond to the mapping positions vp1 to vp5, respectively. In the exhibition venue 500, the center is at (0, 0) and the relative positions of the booths Ba to Be in the exhibition venue 500 are represented. The unit of the numerical value of the exhibition venue 500 is meter (m). On the other hand, since the unit of the numerical value in the virtual space is a virtual unit, the unit is referred to as "unit". In FIGS. 32A and 32B, the physical position of the exhibition venue 500 is reflected as it is on the virtual space, and the actual position is reflected as it is with 1 meter being equal to 1 unit. The player Pb represents the position of the participant Ac in the virtual space. The position of the initial positioning of the player Pb is set to (0, 0).

Figure 33A:
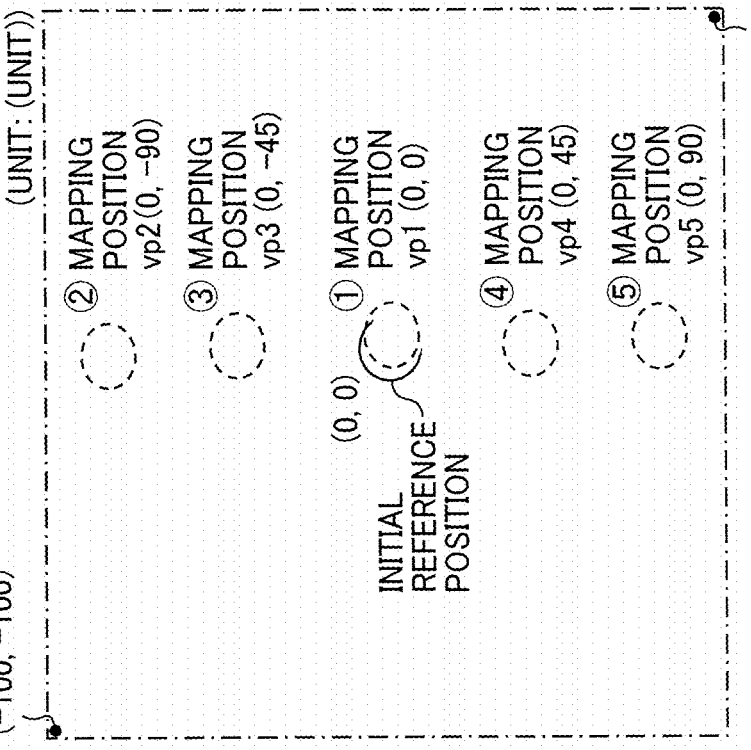
FIG. 33A and FIG. 33B are an illustration for describing another example of how the position in the exhibition venue is mapped to the virtual space, according to an embodiment of the present disclosure.
Figure 33B:
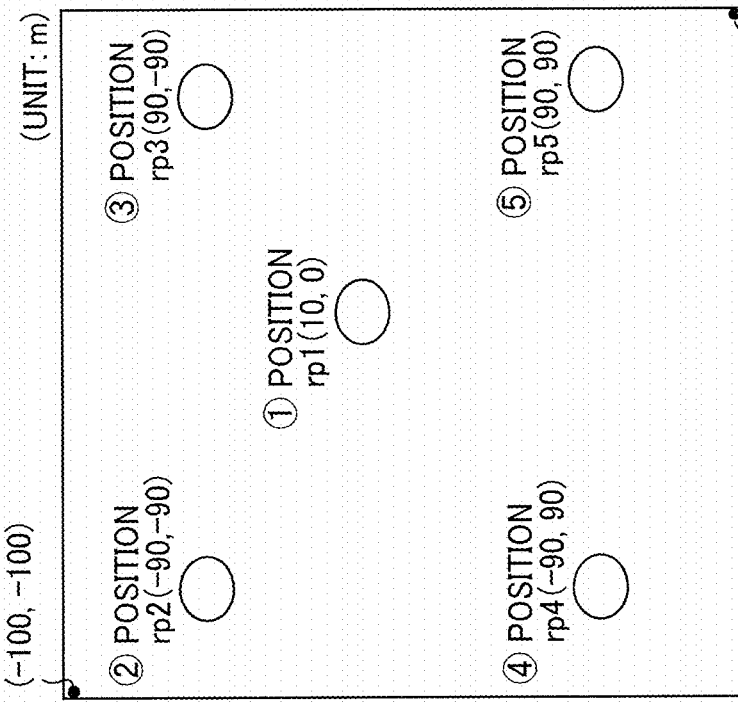

From Generation of Mapping Information to Automatic Selection of Videoconference Terminal (Image Capturing Device):

FIGS. 33A and 33B are an illustration for describing another example of how the position in the exhibition venue is mapped to the virtual space. FIGS. 33A and 33B illustrate an example in which the positions rp1 to rp5 in the exhibition venue 500 in the real space are mapped to the mapping positions vp1 to vp5 in the virtual space 600*a*, without reflecting the actual positions. The mapping positions do not necessarily have to reflect the physical positions.

Further, the constructor Ea can determine how the mapping position reflects the physical position. For example, as in the virtual space 600*a* illustrated in FIG. 33B, the mapping positions vp1 to vp5 can be arranged in the Y-axis direction.

This mapping is suitable for a case in which exhibitions are held in different venues in Japan, for example. For example, when five videoconference terminals are located in five venues in Miyagi, Tokyo, Nagoya, Osaka, and Kitakyushu, respectively, the five videoconference terminals are mapped in order from the north according to their geographical relative positions, rather than according to their physical relative positions. Such mapping allows an image to be displayed on the VR terminal to be switched from an image of the videoconference terminal in one venue to an image of the videoconference terminal in another venue in accordance with the back and forth movement of participant Ac in the play area 400 (the movement of the player Pb in Y-axis direction). This makes it easy for the participant Ac to recognize how to switch the image of the videoconference terminal to be displayed on the VR terminal. In addition, even when the warp or cross key is used instead of the play area 400 (room scale), the participant Ac is only required to operate the player Pb to move back and forth to switch an image to be displayed on the VR terminal from an image of the videoconference terminal in one venue to an image of the videoconference terminal in another venue. This is convenient for the user (participant Ac).

Figure 34:
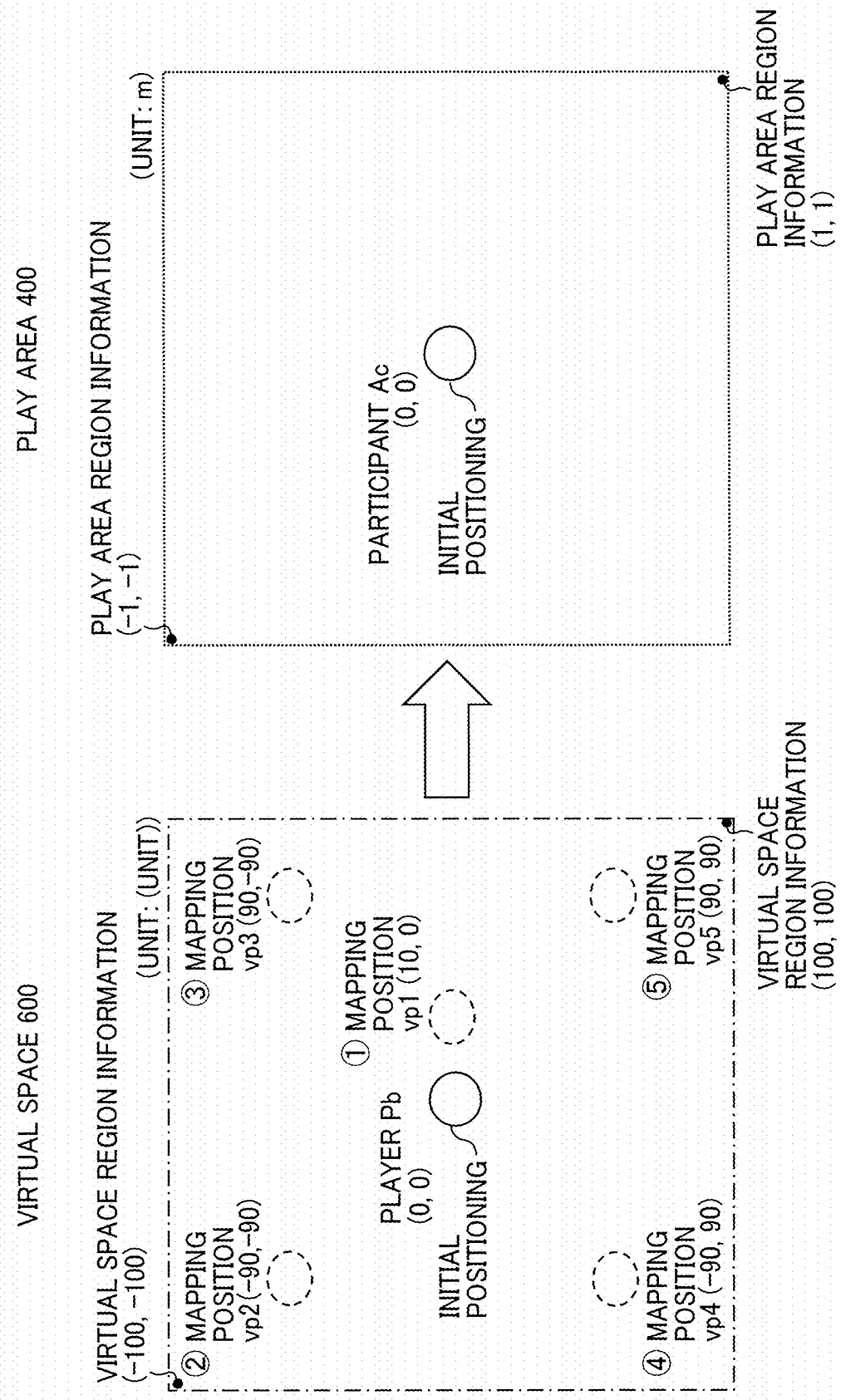
FIG. 34 is an illustration of a virtual space and the room scale, which is means for moving in the virtual space, according to an embodiment of the present disclosure.

Virtual Space and Room Scale as Means for Moving in Virtual Space:

FIG. 34 is an illustration of a virtual space and the room scale, which is means for moving in the virtual space. FIG. 34 illustrates the relation between the virtual space and the room scale as means for moving in the virtual space. The room scale detects the movement of the participant Ac in the play area 400. A value of the scale is applied to the detected movement, and the position of the player Pb in the virtual space is updated to reflect the detected movement. The initial position of the player Pb is (0, 0).

Based on the virtual space region information (−100, −100) and (100, 100) and the play area region information (−1, −1) and (1, 1) illustrated in FIG. 34, the scale (100, 100) is calculated according to the operation by the mapping unit 40 as illustrated in the flowchart of FIG. 30. The unit of the virtual space 600 is a virtual value.

Since the unit of the play area 400 is meter, and the scale is 100 in this example, 100 units are equal to 1 meter. The same description that is provided referring to FIGS. 32A and 32B applies to the mapping positions vp1 to vp5 in FIG. 34.

From Movement in Virtual Space to Automatic Selection of Videoconference Terminal and Image Capturing Device (1):

FIG. 35 is an illustration for describing an example of the movement in the virtual space and how an image to be displayed on the VR terminal is automatically selected from images generated by the videoconference terminals and the image capturing devices. FIG. 35 illustrates an example in which the player Pb moves in the virtual space in accordance with the movement of the participant Ac in the play area 400, and an image data ID of a particular videoconference terminal 3 of the mapping position is automatically selected. In this example, it is assumed that the participant Ac moves in the play area 400 and arrives at the position (0.8, 0.8).

Since the scale (100, 100) is calculated as described with reference to FIG. 34, the position of the player Pb in the virtual space 600 is (−80, −80).

As described with reference to the flowchart of FIG. 31, the distance between each of the mapping positions and the player Pb is calculated at step S824, and the mapping position corresponding to the smallest distance is selected.

In this example, the distance (14, 14), which is calculated as described in step S824, between the player Pb and the mapping position vp2 is the shortest, the mapping position vp2 is selected.

Since an image data ID of the videoconference terminal 3*b* is stored in association with the information of the mapping position in the image capturing device direction/position information list management DB 7003, the image data ID of the videoconference terminal 3*b* is acquired. Thus, an image currently being displayed on the VR terminal of the participant Ac is switched to an image of the videoconference terminal 3*b* and the image of the videoconference terminal 3*b* is displayed on the VR terminal.

Since the videoconference terminal 3*b* as a transmission source of the image is identified by the image data ID, the participant Ac can select the videoconference terminal 3*b* and communicate with the commentator as described with reference to step S828 of FIG. 31. From Movement in Virtual Space to Automatic Selection of Videoconference Terminal and Image Capturing Device (2):

FIG. 36 is an illustration for describing another example of the movement in the virtual space and how an image to be displayed on the VR terminal is automatically selected from images generated by the videoconference terminals and the image capturing devices. FIG. 36 illustrates an example in which the player Pb moves in the virtual space in accordance with the movement of the participant Ac in the play area 400, and an image data ID of a particular videoconference terminal 3 at the mapping position is automatically selected, in a case where the mapping of the videoconference terminals is performed as illustrated in the virtual space 600*a*. In this example, it is assumed that the participant Ac moves in the play area 400 and arrives at the position (0.4, 0.4).

Since the scale (100, 100) is calculated as described with reference to FIG. 34, the position of the player Pb in the virtual space 600 is (−40, −40).

As described with reference to the flowchart of FIG. 31, the distance between each of the mapping positions and the player Pb is calculated, and the mapping position corresponding to the smallest distance is selected. In this example, the distance (40, 31), which is calculated as described in step S824, between the player Pb and the mapping position vp3 is the shortest, the mapping position vp3 is selected.

Since an image data ID of the videoconference terminal 3c is stored in association with the information of the mapping position in the image capturing device direction/position information list management DB 7003, the image data ID of the videoconference terminal 3c is acquired. Thus, an image currently being displayed on the VR terminal of the participant Ac is switched to an image of the videoconference terminal 3c and the image of the videoconference terminal 3c is displayed on the VR terminal.

In addition, the videoconference terminal including the camera, the speaker, and the microphone is identified by referring to the image type management table (see FIG. 19) using the image data ID as a search key, and the identified videoconference terminal is selected. Accordingly, the participant Ac can communicate with the commentator as described with reference to step S828 in FIG. 31.

In the conventional method of generating a multi-viewpoint image, it is assumed that plural celestial-sphere cameras (image capturing devices) are used in a closed local environment. There was no system in which the VR terminal and the communication terminal to which an image capturing device is connected exchange the position information to map the exchanged position information.

As described heretofore, according to the present embodiment, the communication terminal such as the videoconference terminal 3 generates a spherical panoramic image, and further generates a predetermined-area image, based on the image type information associated with the image data ID transmitted with image data. This prevents the front-side hemispherical image and the back-side hemispherical image from being displayed.

As described heretofore, according to an embodiment of the present disclosure, A plurality of sets of an image capturing device and a videoconference terminal used for communication of video (image) captured by the image capturing device are installed in an exhibition venue of a real space (see FIG. 8 and FIG. 27). On the other hand, the position sensor (1) 301 and the position sensors (2) 302 are located in a play area such as a meeting room of a real space, allowing a participant wearing the head-mounted display terminal 8 to communicate with the PC 7 (see FIG. 8 and FIG. 29). An image captured by each of the videoconference terminals is sent to the PC 7 via the communication management system 5. When the participant moves in the play area in the above state, the image sent from a particular videoconference terminal located at a position in the exhibition venue corresponding to the participant's movement position is displayed on the participant's head-mounted display. Further, a position in the exhibition venue of the real space and a position in the play area of the real space are associated via the virtual space (see FIG. 28). This enables to associate a predetermined arrangement of the image capturing devices in the exhibition venue mapped on the virtual space with a path on which the VR terminal is caused to move in the real space where the VR terminal is used. In other words, the predetermined arrangement of the image capturing devices mapped on the virtual space can be different from the arrangement of the plurality of image capturing devices. For example, as illustrated in FIG. 33A and FIG. 33B, by locating the image capturing devices in the virtual space 600 in an arrangement that is different from the arrangement of the image capturing devices in the exhibition venue 500, when the participant moves in the play area in the order as illustrated in FIG. 33B, the participant moves in the exhibition venue in order as illustrated in FIG. 33A in the virtual environment. This allows the participant to view an image of each of the exhibition venues as if the participant move around the exhibition venues, even when the participants can move in the play area only straightly since the play area is small.

Further, a plurality of image capturing devices (cameras) in the real space is mapped to the virtual space and an image to be displayed on the VR terminal is switched from an image captured by one of the plurality of cameras to another image captured by another one of the plurality of cameras. Thus, a set of the camera, the microphone and the speaker is selected, allowing the user (participant) to communicate with a person in the exhibition venue who is in front of or near the image capturing by which the image after the switching is captured, in addition to allowing the user (participant) to recognize the atmosphere around the camera by which the image after the switching is captured.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

For example, in this disclosure, the spherical panoramic image does not have to be a full-view (360-degree) spherical image. For example, the spherical image can be a wide-angle view image having an angle of about 180 to 360 degrees in the horizontal direction.

Any one of the above-described operations may be performed in various other ways, for example, in an order different from the one described above.

Each of the functions of the described embodiments can be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

What is claimed is:

1. A virtual reality (VR) system comprising:
an image capturing device;
a communication terminal including first circuitry;
a communication management system including second circuitry; and
a VR terminal including third circuitry,
wherein the first circuitry of the communication terminal is configured to:
input position information of the image capturing device; and
transmit, to the communication management system, the position information of the image capturing device and image identification information for identifying image data to be transmitted by the communication terminal,
the second circuitry of the communication management system is configured to:

receive the position information of the image capturing device and the image identification information; and transmit, to the VR terminal, the position information of the image capturing device and the image identification information that are associated with each other, and the third circuitry of the VR terminal is configured to:

store in a memory, for each of a plurality of communication terminals including the communication terminal, the position information of the image capturing device and the image identification information associated with the position information of the image capturing device, transmitted from the communication management system;

select, from among the position information stored in the memory, the position information of the image capturing device according to a position of the VR terminal; and display an image of image data indicated by particular image identification information associated with the selected position information on a display.

2. The VR system of claim 1, wherein a real space in which the image capturing device and the communication terminal are located and another real space in which the VR terminal is used are associated via a virtual space.

3. The VR system of claim 2, wherein the third circuitry of the VR terminal is further configured to:

map positions indicated by the position information of the image capturing device managed by the third circuitry on the virtual space in a predetermined arrangement;

select, from among the mapped positions, a position of the image capturing device mapped on the virtual space based on the position of the VR terminal in the another real space; and display the image of image data indicated by the particular image identification information associated with the position information of the selected position of the image capturing device on the display.

4. The VR system of claim 3, wherein the predetermined arrangement is different from an arrangement of a plurality of image capturing devices including the image capturing device, and corresponds to a path on which the VR terminal is caused to move in the another real space where the VR terminal is used.

5. The VR system of claim 1, wherein the third circuitry of the VR terminal is further configured to acquire position information indicating the position of the VR terminal in a real space from a position sensor located in the real space.

6. The VR system of claim 1, wherein the VR terminal is implemented by a head-mounted display and a personal computer.

7. The VR system of claim 1, wherein the VR terminal is implemented by a smartphone.

8. The VR system of claim 1, wherein the communication terminal is a videoconference terminal configured to perform video communication via the communication management system.

9. A communication method performed by a VR system including an image capturing device, a communication terminal to communicate image data that is output from the image capturing device, a communication management system, and a VR terminal, the method comprising:

by the communication terminal, inputting position information of the image capturing device; and transmitting, to the communication management system, the position information of the image capturing device and image identification information for identifying image data to be transmitted by the communication terminal, by the communication management system, receiving the position information of the image capturing device and the image identification information; and transmitting, to the VR terminal, the position information of the image capturing device and the image identification information that are associated with each other, and by the VR terminal, storing, for each of a plurality of communication terminals including the communication terminal, the position information of the image capturing device and the image identification information associated with the position information of the image capturing device, transmitted from the communication management system;

selecting the position information of the image capturing device according to a position of the VR terminal; and display an image of image data indicated by particular image identification information associated with the selected position information on a display.

10. The communication method of claim 9, wherein a real space in which the image capturing device and the communication terminal are located and another real space in which the VR terminal is used are associated via a virtual space.

11. A non-transitory computer-readable medium storing a program causing a computer to execute the communication method of claim 9.

* * * * *